US011897735B2

(12) United States Patent
Cánovas Martínez et al.

(10) Patent No.: US 11,897,735 B2
(45) Date of Patent: Feb. 13, 2024

(54) AUTOMATICALLY FOLDING AND UNFOLDING TOWER CRANE

(71) Applicant: Sáez Machinery, S.L., Murcia (ES)

(72) Inventors: Daniel Cánovas Martínez, Murcia (ES); Laura Cánovas Sáez, Murcia (ES)

(73) Assignee: SAEZ MACHINERY, S.L., Murcia (ES)

( * ) Notice: Subject to any disclaimer, the term of this patent is extended or adjusted under 35 U.S.C. 154(b) by 19 days.

(21) Appl. No.: 17/522,250

(22) Filed: Nov. 9, 2021

(65) Prior Publication Data

US 2022/0144600 A1 May 12, 2022

(30) Foreign Application Priority Data

Nov. 9, 2020 (ES) .................................. 202031127

(51) Int. Cl.
*B66C 23/68* (2006.01)
*B66C 23/34* (2006.01)
*B66C 23/00* (2006.01)

(52) U.S. Cl.
CPC ............ *B66C 23/68* (2013.01); *B66C 23/342* (2013.01); *B66C 23/54* (2013.01)

(58) Field of Classification Search
CPC ....... B66C 23/68; B66C 23/42; B66C 23/342; B66C 23/54; B66C 23/348
See application file for complete search history.

(56) References Cited

U.S. PATENT DOCUMENTS

| | | | | |
|---|---|---|---|---|
| 3,161,299 A * | 12/1964 | Noly | B66C 23/346 | 212/299 |
| 4,446,975 A * | 5/1984 | Konig | B66C 23/342 | 212/199 |
| 6,290,078 B1 * | 9/2001 | Verchere | B66C 23/26 | 212/300 |
| 6,655,539 B2 * | 12/2003 | Bertinotti | B66C 23/342 | 212/300 |
| 2002/0096484 A1 * | 7/2002 | Bertinotti | B66C 23/342 | 212/300 |

(Continued)

FOREIGN PATENT DOCUMENTS

DE 3245262 A * 6/1984 .......... B66C 23/342

OTHER PUBLICATIONS

DE 3,245,262 A1 Machine Translation (Year: 1984).*

*Primary Examiner* — Michael R Mansen
*Assistant Examiner* — Juan J Campos, Jr.
(74) *Attorney, Agent, or Firm* — KARISH & BJORGUM, PC

(57) ABSTRACT

An automated collapsible tower crane comprising a mast with telescopic portions, a boom with boom sections articulated with each other by respective rotary joints, a boom folding system to unfold and fold the boom by the rotary joints wherein each proximal and distal rotary joint is associated with at least one hydraulic actuator to unfold and fold boom sections, a mast folding system to fold the mast down, wherein in the transport position the boom sections are folded down one on top of the other and on the mast, and the boom folding and unfolding system acts independently of the folding and telescoping system of the mast, and comprises hydraulic actuators to fold and unfold the boom sections.

7 Claims, 20 Drawing Sheets

(56) References Cited

U.S. PATENT DOCUMENTS

| | | | | |
|---|---|---|---|---|
| 2006/0065616 | A1* | 3/2006 | Diehl | B66C 23/90 212/300 |
| 2014/0131300 | A1* | 5/2014 | Scampini | B66C 23/68 212/300 |

* cited by examiner

Fig. 14
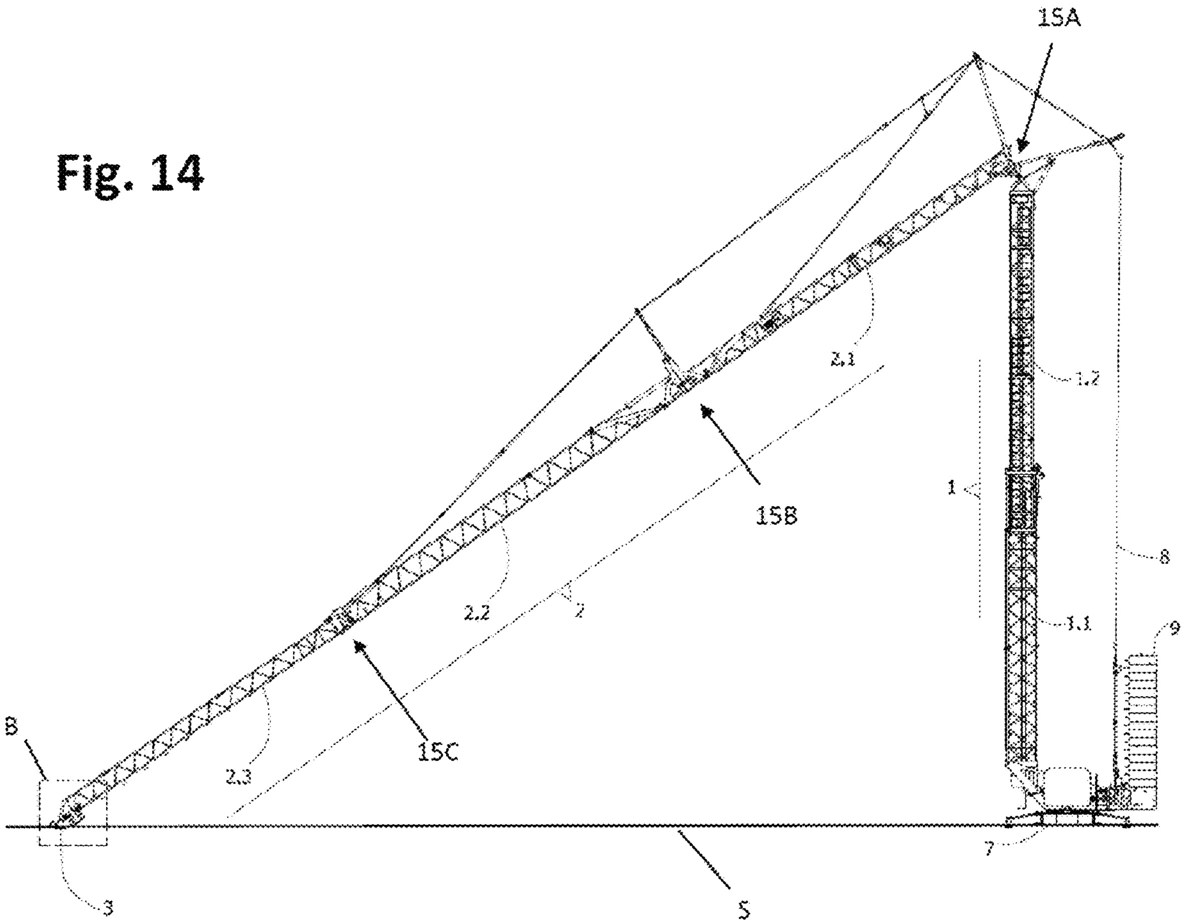
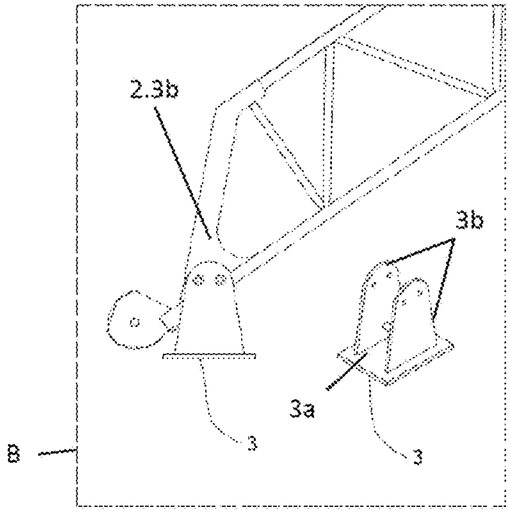
Fig. 14A

AUTOMATICALLY FOLDING AND UNFOLDING TOWER CRANE

CROSS-REFERENCE TO RELATED APPLICATIONS

This patent application claims priority to ES P202031127 filed on Nov. 9, 2020, entitled "AUTOMATICALLY FOLDING AND UNFOLDING TOWER CRANE", the contents of which are incorporated herein by reference in their entirety.

TECHNICAL FIELD OF THE INVENTION

The present invention belongs to the technical field of tower cranes and particularly to the technical field of automated folding and unfolding tower cranes.

STATE OF THE ART PRIOR TO THE INVENTION

Rotating tower cranes typically comprise a vertical mast made up of several telescopic sections and a horizontal arm called a boom. It is common in construction sites, or places where these cranes are used, that work needs to be done in confined spaces. This problem is solved by using a boom composed of several boom sections that can be folded and unfolded by means of joints arranged between the boom sections, which allows working at different boom lengths.

In addition, it is common for rotating tower cranes to be retracted for transport by road or other routes, from one construction site to another, or from one location to another, in the best possible conditions of speed, safety, and space occupation.

To facilitate folding and unfolding or deploying, from its retracted transport position to its working position, as well as the reverse operation of passing from the working position to the transport position when retracted, automated or self-assembly tower cranes have been designed.

To achieve automated folding and assembly of towers and booms, rotating tower cranes are known and numerous technical solutions have been proposed for making telescopic towers and folding booms of cranes composed of several folding boom sections.

Thus, EP2250057T3, for example, describes a self-assembly rotating crane with telescopic mast, at the outer end of which a joint piece has been articulated that is joint-connected to the boom. A bracing cable runs from a fixed point on the rotating platform supporting the tower, through supports on the mast and the boom, such that the crane can be brought to its upright operating position by telescopic extraction of the mast. Driving the folding and telescoping of the mast is carried out by means of a pulley mechanism and a cable that is wound or unwound on a drum located on the rotating platform consisting of the towing of this cable on one of the inner sections of the mast. Similarly, another cable mechanism located on the boom, carries out the folding of the different sections of the boom.

However, in this type of crane in which the boom is driven by means of a cable mechanism, the length of the boom can only be changed when the tower is retracted. This hinders and obstructs work tasks on the construction site or place of use in the event of any necessary change in the length of the boom. Another added difficulty in the event of possible repairs to the boom elements, when the crane is in an upright working position, is the impediment of access by operators to the boom without the necessary assistance of auxiliary mobile cranes.

On the other hand, in ES2721303 T3 and similarly in ES2180131T3 and EP1398291A1, an automatic unfolding and folding tower crane is described, comprising a mast and a boom movable between an operating configuration (vertical mast and horizontal boom) and a transport configuration (mast and boom folded), where the mast has an upper section connected to a first boom section rotating around a joint axis, and where the boom extends. Driving the folding of the mast is carried out by means of a hydraulic actuator while driving the telescoping of the mast is carried out by its own hydraulic actuators. Driving the folding of the boom is also carried out by its own hydraulic actuators.

In this type of crane, in which the boom is driven by hydraulic actuators, changes in the boom lengths are allowed with the tower fully unfolded. However, the folding and telescoping of the mast by means of hydraulic actuators, has an impact on a greater number of auxiliary elements and devices, increasing the complexity and maintenance in this type of crane. In this case, also in the event of possible repairs to the boom elements, when the crane is in an upright working position, there is the impediment of access by operators to the boom without the necessary assistance of auxiliary mobile cranes.

It is thus desirable to eliminate these drawbacks of the state of the art by providing a tower crane with automated assembly that must be retracted for transport, from one construction site to another, or from one location to another, in the best conditions of safety, maintenance and boom operability, while offering a solution for the storage and transport of the crane.

DESCRIPTION OF THE INVENTION

The object of the present invention is to solve the aforementioned drawbacks by means of an automated assembly collapsible tower crane between a transport position and a working position, comprising: a telescopically extending mast with at least an upper telescopic portion with an upper end part, and a lower telescopic portion with a lower part rotatably anchored in a vertical plane to a lower base platform of the tower crane; a mast locking mechanism to lock the lower telescopic portion in a locked position in a substantially vertical plane with respect to a lower base platform of the tower crane; a telescoping system of the mast to telescopically extend and retract the mast between a retracted vertical position in which the mast is in its non-extended vertical position and an extended vertical position in which the mast extends upwards, the telescoping system comprising a combination of cable and pulleys driven by a winch; a boom comprising a plurality of boom sections articulated in respective rotary joints along respective rotation angles limited to substantially 180° around respective horizontal axes to stiffen the boom when it is extended, the boom sections including a first boom section articulated with the upper end part of the upper telescopic portion of the mast and at one end of the proximal portion of a second boom section; a boom folding system for unfolding and folding the boom by the rotary joints between a folded position and at least one linearly unfolded working position along a substantially horizontal plane; a boom reinforcement system to strengthen the boom in a working position, the boom reinforcement system comprising a bracing sling anchored to the base platform as well as to a first superiorly articulated vertically rotatable support strut of a proximal portion of the first boom section, a second vertically rotatable support strut articulated posteriorly of the proximal portion of the first boom section, and at least a third superiorly articulated vertically rotatable support strut of a distal portion of the first boom section of the boom.

The sling is connected to the support struts. In the transport position the boom sections are folded down over one another and on the mast in folding planes. The boom folding and unfolding system acts independently of the combination of cables and pulleys driven by the winch of the telescoping system; and comprises hydraulic actuators hydraulically powered by hydraulic equipment for folding and unfolding the boom sections. Each proximal and distal rotary joint is associated with at least one hydraulic actuator arranged to unfold and fold boom sections relative to one another.

The terms “proximal” and “distal” used herein in relation to boom elements mean, respectively, “closer to the tower” and “further away from the tower” when the boom is unfolded.

According to an embodiment of the invention, the boom can comprise two or more boom sections. Thus, for example, the second boom section can constitute a distal boom portion with a free distal end or an intermediate boom portion. In this second alternative, from its connection to the first support strut, the sling is divided into a first branch and a second branch. The first branch is connected to a distal portion of the first boom section while the second branch is connected to a distal portion of the second boom section. In turn, the boom comprises a third boom section with a proximal portion articulated with the distal portion of the second boom section, and this third boom section constitutes a distal boom portion with a free distal end.

According to an embodiment of the invention, the crane can comprise an auxiliary support on which the free distal end of the distal portion rests when it rests on the ground when the boom is unfolded and, preferably, the mast is in a maintenance position between its vertical retracted position and its vertical extended position.

In a preferred embodiment of the invention, the first boom section and the second boom section are articulated by a proximal rotary joint. In this embodiment, the proximal rotary joint comprises a joint body with a first lower end part in which a first lower horizontal axis is arranged on which one end of the distal portion of the first boom section is rotatably coupled, a second lower end part in which a second lower horizontal axis is arranged on which one end of the proximal portion of the second boom section is rotatably coupled, a first upper part, a second upper part. The first upper part comprises a first upper horizontal axis in which it is articulated with a distal end of a first hydraulic actuator, the first actuator comprising a proximal end articulated with an upper point in the distal portion of the first boom section, while the second upper part with a second upper horizontal axis articulated with a proximal end of a second hydraulic actuator, the second hydraulic actuator comprising, a distal end articulated with an upper point in the proximal portion of the second boom section, and the lower horizontal axes are further apart from each other than the upper horizontal axes.

In another advantageous embodiment of the invention, the distal boom section is articulated with the preceding boom section by means of a distal rotary hinge joint comprising a horizontal primary joint axis, a fixed arm and a rotary angle arm. The primary horizontal joint axis articulates the proximal portion of the distal section with the distal portion of the preceding boom section. The fixed lever arm is immobilised in the proximal portion of the distal boom section and has a free end with a secondary joint axis. In turn, the rotary angle arm comprises a first leg articulated with the primary horizontal joint axis and a second leg articulated with the secondary joint axis and an intermediate part between the first and second legs of the tilting angle arm in which the distal end of the hydraulic actuator is articulated, the proximal end of which is articulated in the distal portion of the preceding boom section.

BRIEF DESCRIPTION OF THE DRAWINGS

Embodiments of the invention will be described below on the basis of figures, wherein

FIG. 14 is a side elevation view of the crane according to the invention in a maintenance position;

FIG. 14A is an enlarged view corresponding to rectangle B marked in FIG. 14;

Figures 1, 1A:
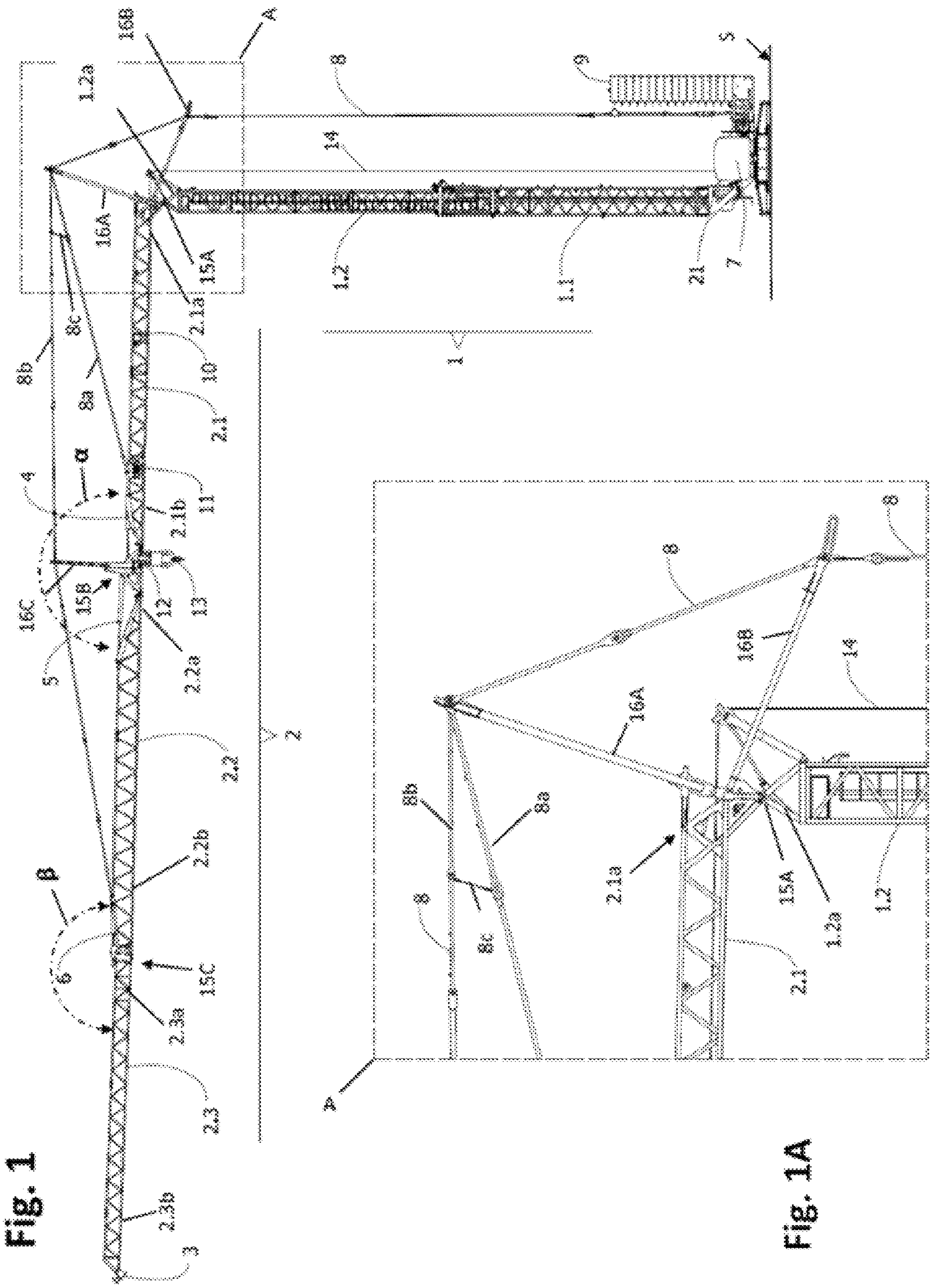
FIG. 1 is a side elevation view of an embodiment of a rotating tower crane according to the invention in its working position.
FIG. 1A is an enlarged view corresponding to the rectangle A marked in FIG. 1, corresponding to the boom reinforcement system.

Reference signs appear in the figures that identify the following elements:

S ground
α, β rotation angles
1 mast
1.1 lower telescopic portion
1.2 upper telescopic portion
1.2*a* upper end part
2 boom
2.1 first boom section
2.1*a* proximal portion
2.1*b* distal portion
2.2 second boom section
2.2*a* proximal portion
2.2*b* distal portion
2.3 third boom section
2.3*a* proximal portion
2.3*b* free distal end
3 auxiliary support
3*a* base
3*b* vertical wings
4 first hydraulic actuator
4*a* proximal end
4*b* distal end
5 second hydraulic actuator
5*a* proximal end
5*b* distal end
6 third hydraulic actuator
6*a* proximal end
6*b* distal end
7 base platform
8 sling
8*a* first branch
8*b* second branch
9 counterload
10 hydraulic equipment
11 motor equipment
12 carriage
13 hoist hook
14 hoist rope
15A first rotary joint
15B proximal rotary joint,
15C distal rotary hinge joint
4, 5, 6 hydraulic actuators
16A first support strut
16B second support strut
16C third support strut
17*a* first lower horizontal axis
17*b* second lower horizontal axis
17*c* first upper horizontal axis

17*d* upper horizontal axis
18 joint body
18*a* proximal part
18*b* distal part
18*c* connector mechanism
19 telescoping system
19*a* winch
19*b* cable
19*c*, 19*d*, 19*e*, 19*f* pulleys
20*a* primary horizontal joint axis
20*b* tilting angle arm
20*c* a secondary joint axis
20*d* fixed lever arm (20*d*)
20.2*a* a first leg
20.2*b* a second leg
21 mast locking mechanism

DETAILED DESCRIPTION

FIGS. 1 and 1A illustrate an embodiment of a rotating tower crane in its working position. In this embodiment, the automated assembly collapsible tower crane shown between a transport position and a working position, comprises a mast (1), a mast locking mechanism (21) to lock the lower telescopic portion (1.1) in a locked position in a substantially vertical plane with respect to a rotating lower base platform (7) of the tower crane and a boom (2). The lower base platform (7) receives a counterload (9) when the tower crane is in the working or maintenance operating configuration.

The mast (1) comprises an inner upper telescopic portion (1.2) with an upper end part (1.2*a*), vertically movable in an outer lower telescopic portion (1.1) with a lower part rotatably anchored in a vertical plane to a lower base platform (7) of the tower crane. The upper telescopic portion (1.2) can be moved vertically inside the lower telescopic portion by means of a telescoping system (19) (see FIG. 4A) to telescopically extend and retract the mast (1) between a retracted vertical position in which the mast (1) is in its non-extended vertical position and an extended vertical position in which the mast (1) extends upward. The telescoping system (19) comprises a combination of cable (19*b*) and pulleys (19*c*, 19*d*, 19*e*, 19*f*) driven by a winch (19*a*) (see FIG. 4*a*).

The boom (2) comprises a plurality of boom sections (2.1, 2.2, 2.3) articulated in respective rotary joints (15A, 15B, 15C), namely, a first rotary joint (15A), a proximal rotary joint (15B) and a distal rotary joint (15C). The proximal and distal rotary joints (15B, 15C) are capable of being rotated along respective rotation angles (β, β) limited to substantially 180° around respective horizontal axes to stiffen the boom (2) when extended.

The boom sections are a first boom section (2.1) articulated with the upper end part (1.2*a*) of the upper telescopic portion (1A) of the mast (1) and with one end of the proximal portion (2.2*a*) of a second boom section (2.2) that forms an intermediate boom portion, and a third boom section (2.3) with a proximal portion (2.3*a*) articulated with the distal portion (2.2*b*) of the second boom section (2.2) that forms a distal boom portion with a free distal end (2.3*b*).

The tower crane further comprises a boom reinforcement system for strengthening the boom in a working position. The boom reinforcement system comprises a bracing sling (8) anchored to the base platform (7) as well as to a first superiorly articulated vertically rotatable support strut (16A) of a proximal portion (2.1*a*) of the first boom section (2.1), a second posteriorly articulated vertically rotatable support strut (16B) of the proximal portion (2.1*a*) of the first boom section (2.1), and a third superiorly articulated vertically rotatable support strut (16C) of a distal portion (2.1*b*) of the first boom section (2.1) of the boom (2). The sling (8) is connected to the support struts (16A, 16B, 16C). From its connection to the first support strut (16A), the sling (8) is divided into a first branch (8*a*) and a second branch (8*b*). The first branch (8*a*) is connected to a distal portion (2.1*b*) of the first boom section (2.1) of the boom (2) while the second branch (8*b*) is connected to a distal portion (2.2*b*) of the second boom section (2.2) of the boom (2).

The crane is provided with a boom (2) folding system for unfolding and folding the boom (2) by the rotary joints (15A, 15B, 15C) between a folded position and at least one linearly unfolded working position along a substantially horizontal plane.

The boom (2) folding and unfolding system acts independently of the combination of cables and pulleys driven by the winch (19*a*) of the telescoping system (19), and comprises hydraulic actuators (4, 5, 6) hydraulically powered by hydraulic equipment (11) to fold and unfold the boom sections (2.1, 2.2, 2.3), for which each proximal and distal rotary joint (15B, 15C) is associated with at least one hydraulic actuator (4, 5, 6) arranged to unfold and fold boom sections (2.1, 2.2, 2.3) relative to each other.

Figure 1B:
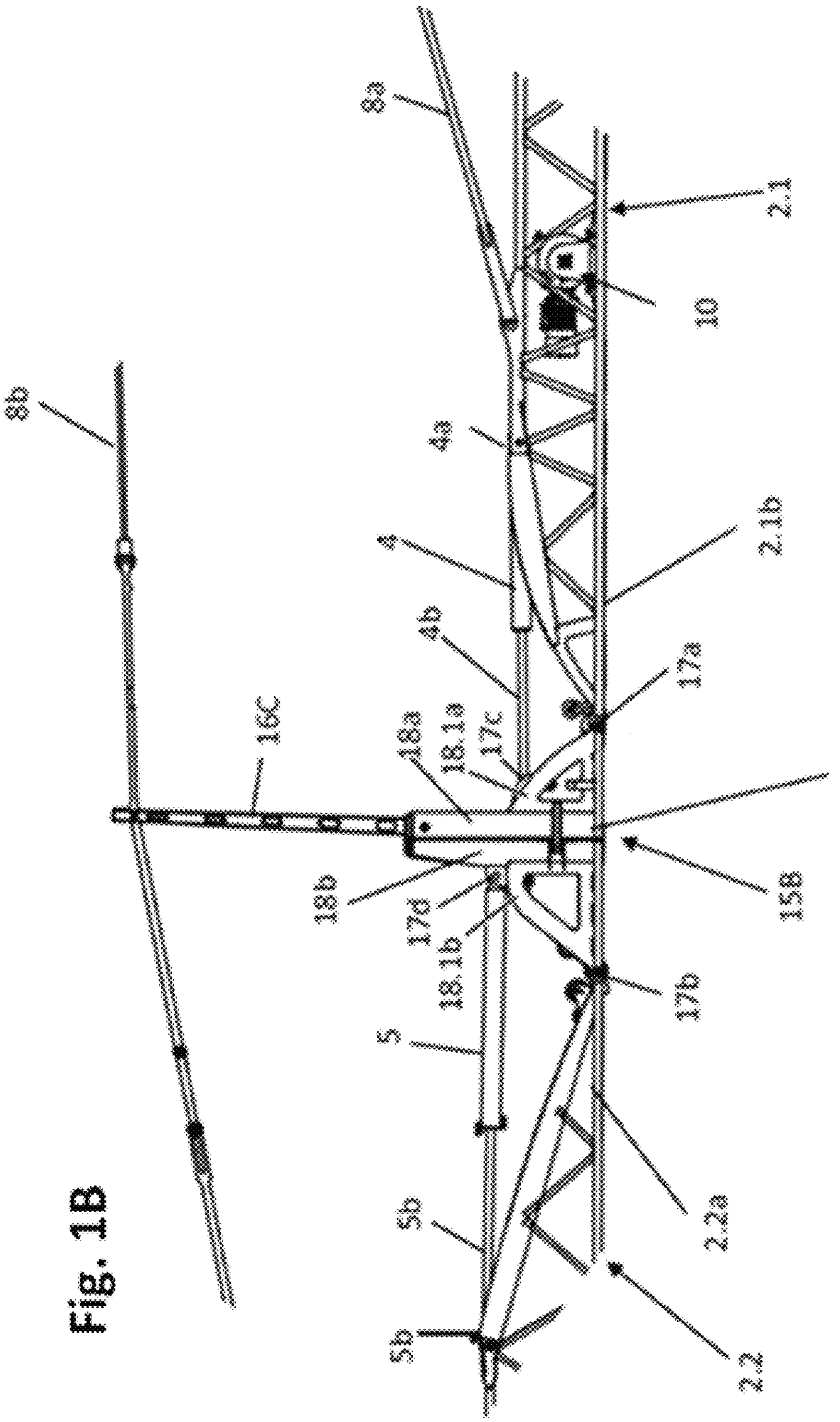
FIG. 1B is an enlarged view of the area around joint 15B of the crane illustrated in FIG. 1.
Figure 1C:
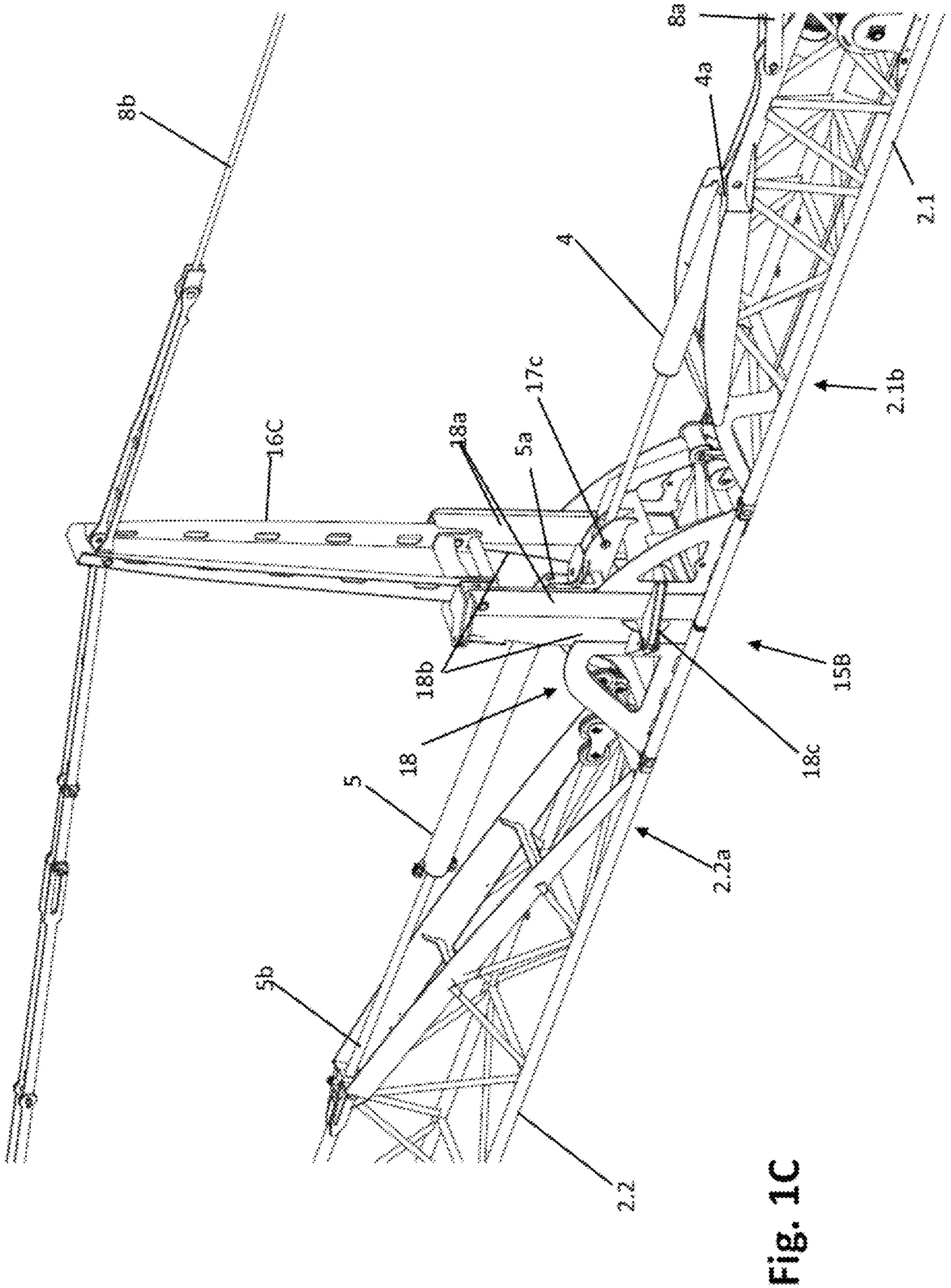
FIG. 1C is an enlarged top perspective view of the area around joint 15B of the crane illustrated in FIG. 1B.

The tower crane further comprises a hoist cable (14) at the free end of which a hoist hook (13) is coupled, which is guided by an electric carriage (12), powered by motor equipment (11). The carriage 12 can move along the boom (2) for which the boom sections (2.1, 2.2, 2.3) are provided with guide rails (not detailed in the figures) that are flush with each other when the boom (2) is unfolded in its working position. In FIGS. 1B and 1C, the elements associated with the proximal rotary joint (15B) can be seen in more detail. Thus, it can be seen that the proximal rotary joint (15B) comprises a joint body (18).

The joint body (18) is composed of a proximal part (18*a*) arranged in the distal portion (2.1b) of the first boom section (2.1) and a distal part (18*b*) arranged in the proximal portion (2.2A) of the second boom section (2.2). Said proximal (18*a*) and distal (18*b*) parts are joined on one side by means of a hinge mechanism (not shown in FIGS. 1B and 1C) and on the opposite side by means of a connector mechanism (18*c*). These mechanisms allow the second boom section (2.2) to be rotated with respect to the first boom section (2.1) in an initial phase of boom (2) deployment and a final phase of boom (2) retraction.

The proximal part (18*a*) of the joint body (18) comprises a first lower end part in which a first lower horizontal axis (17*a*) is arranged in which one end of the distal portion (2.1*b*) of the first boom section (2.1) is rotatably coupled. The distal part (18*b*) of the joint body (18) comprises a second lower end part in which a second lower horizontal axis (17*b*) is arranged in which one end of the proximal portion (2.2*a*) of the second boom section (2.2) is rotatably coupled.

The proximal part (18*a*) of the joint body (18) further comprises a first upper part (18.1*a*) with a first upper horizontal axis (17c) in which it is articulated with a distal end (4*b*) of a first hydraulic actuator (4), the first actuator (4) comprising a proximal end (4*a*) articulated with an upper point in the distal portion (2.1*b*) of the first boom section (2.1). The distal part (18*b*) of the joint body (18) further and a second upper part (18.1*b*) with a second upper horizontal axis (17*d*) articulated with a proximal end (5*a*) of a second hydraulic actuator (5), the second hydraulic actuator (5) comprising a distal end (5*b*) articulated with an upper point in the proximal portion (2.2*a*) of the second boom section (2.2). The lower horizontal axes (17*a*, 17*b*) are further apart from each other than the upper horizontal axes (17*c*, 17*d*).

Figure 1D:
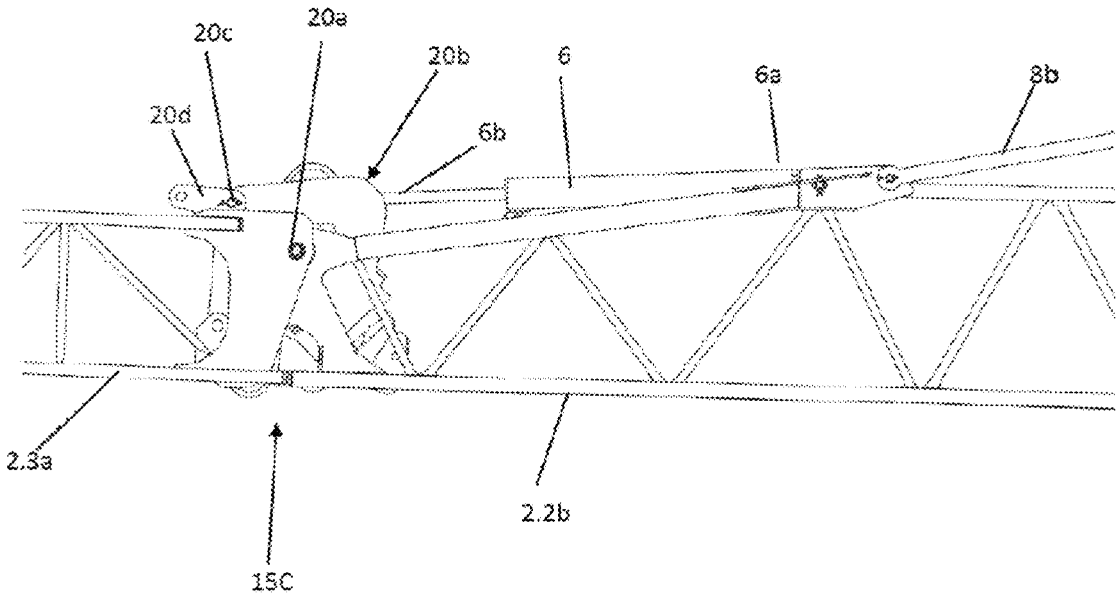
FIG. 1D is an enlarged view of the area near the joint 15C of the crane illustrated in FIG. 1.
Figure 1E:
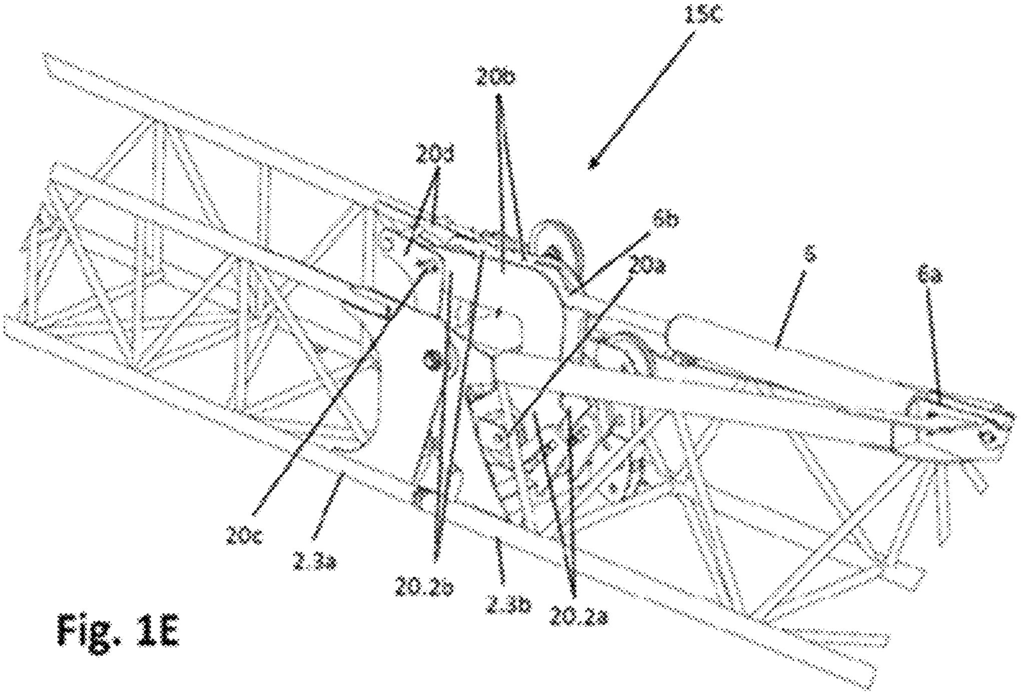
FIG. 1E is an enlarged perspective view of the area near the joint 15B of the crane illustrated in FIG. 1D.

FIGS. 1D and 1E show in more detail the elements associated with the distal rotary joint (15C). The distal boom section (2.3) is articulated with the second boom section (2.2) by means of the distal rotary hinge joint (15C) comprising a primary horizontal joint axis (20*a*), a fixed lever arm (20*d*) as well as a rotary angle arm (20*b*).

The primary horizontal joint axis (20*a*) articulates the proximal portion (2.3*a*) of the distal section (2.3) with the distal portion (2.2*b*) of the second boom section (2.2) while the fixed lever arm (20*d*) is made up of two parallel side plates and immobilised in the proximal portion (2.3*a*) of the distal boom section (2.3) and has a free end with a secondary joint axis (20*c*).

The tilting angle arm (20*b*) comprises two parallel side plates that together make up a first leg (20.2*a*) articulated with the primary horizontal joint axis (20*a*) and a second leg (20.2*b*) articulated with the secondary joint axis (20*c*). The distal end (6*b*) of the hydraulic actuator (6) is articulated with the tilting angle arm (20*b*), while the proximal end (6*a*) of the hydraulic actuator is articulated in the distal portion (2.2*b*) of the second boom section (2.2).

Figure 3:
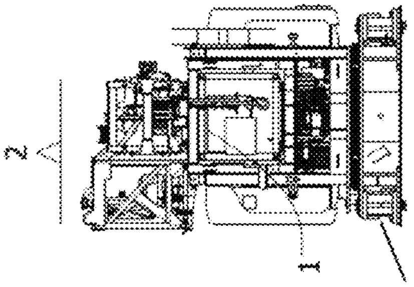
FIG. 3 is a front elevation view of the crane in the transport position illustrated in FIG. 2.
Figure 2:
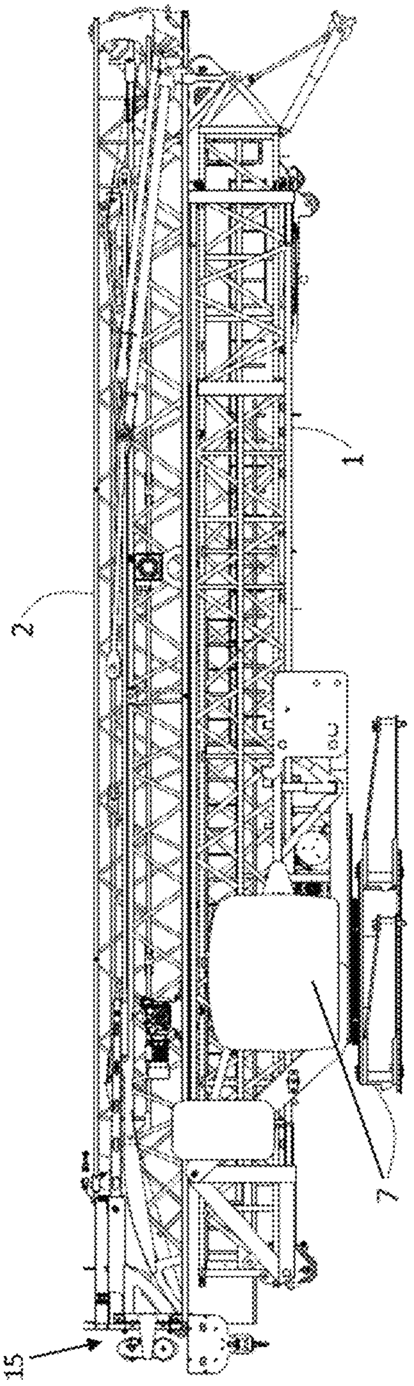
FIG. 2 is a side elevation view of the crane illustrated in FIG. 1 in a transport position.

FIGS. 2 and 3 show the tower crane in its transport position, wherein the tower (1) is folded down and the boom sections are folded over the folded down tower.

Figure 4:
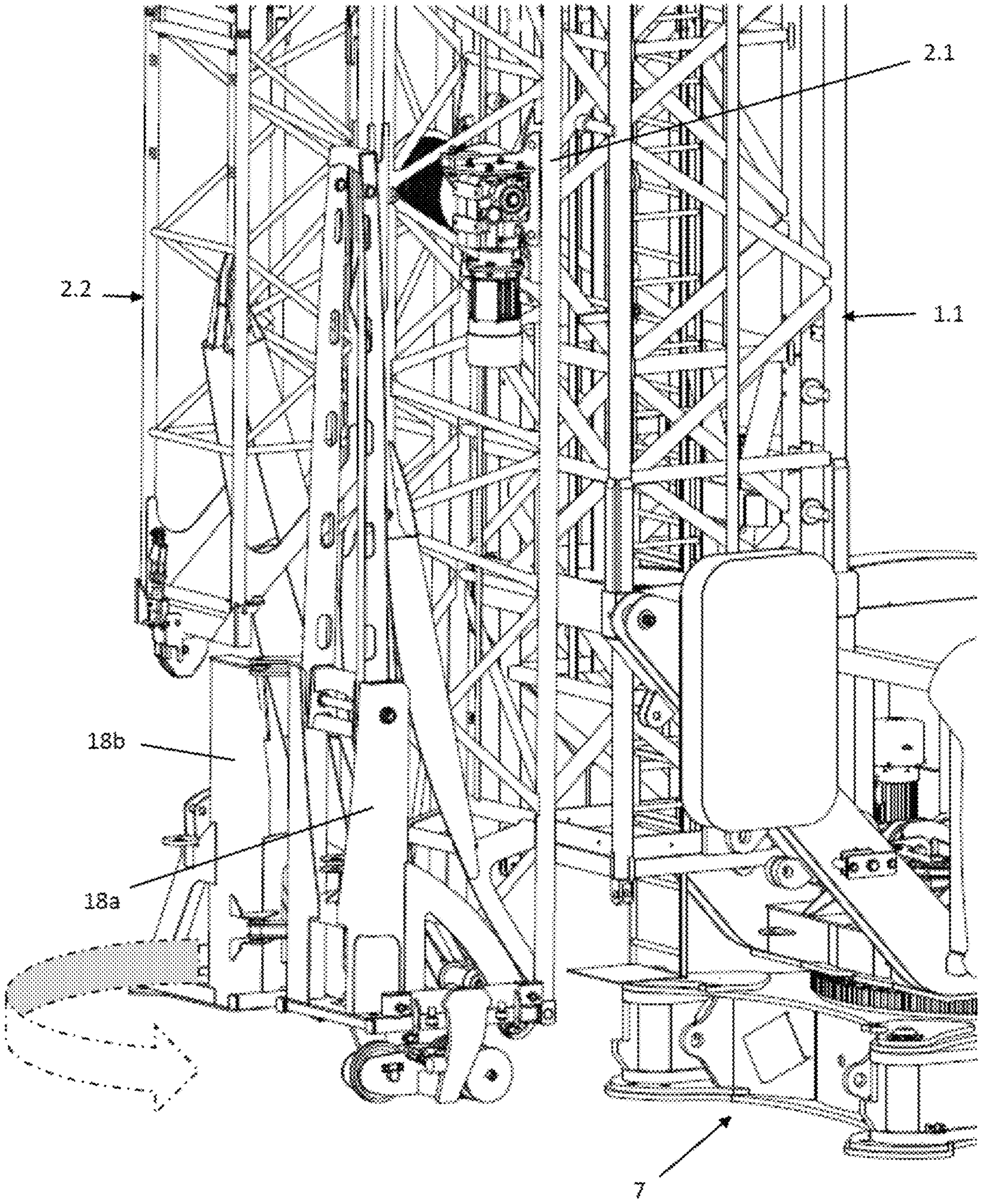
FIG. 4 is a front perspective view of the lower part of the crane of FIG. 1 in a deployment phase from the transport position towards its working position in which the mast is unfolded towards a vertical position while the boom it not unfolded.

FIG. 4 illustrates the crane with the tower (1) in a vertical erection phase and the folded boom sections and not yet unfolded before the second boom section (2.2) has been bent (in the direction of the arrow) on the first boom section (2.1) and before the proximal and distal parts (18*a*, 18*b*) of the joint body (18) have been brought together and locked to form the joint body.

Figure 4A:
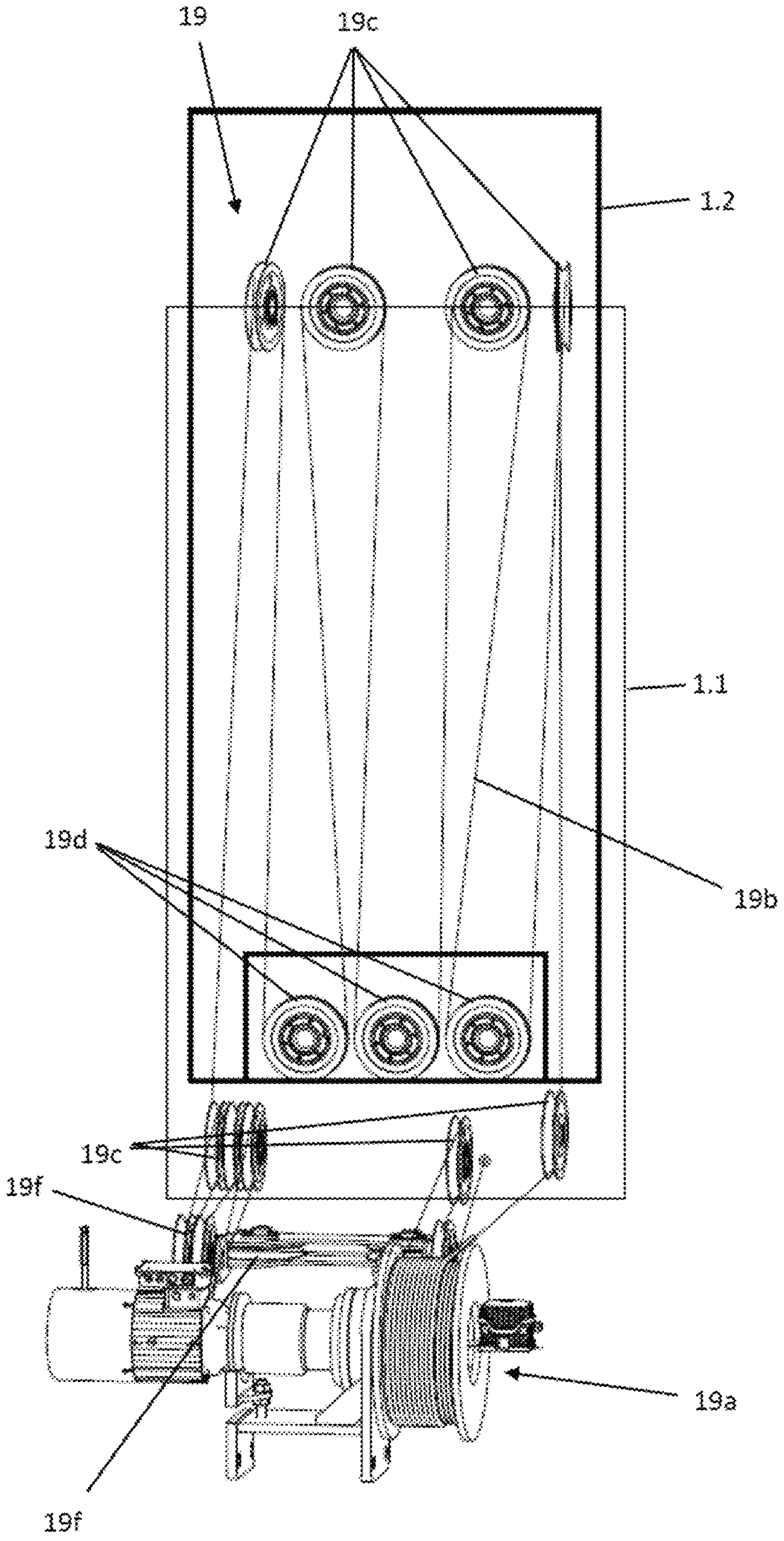
FIG. 4A is a schematic view of an embodiment of the telescoping system applicable to the crane according to the invention.

In FIG. 4A, a telescoping system (19) comprising a winch (19*a*), a cable (19*b*), a set of pulleys (19*c*, 19*d*) arranged as a hoist in the upper telescopic portion and guiding pulleys (19*e*, 19*f*), arranged in the lower telescopic portion (1.1) of the mast (1) can be seen.

Figure 5:
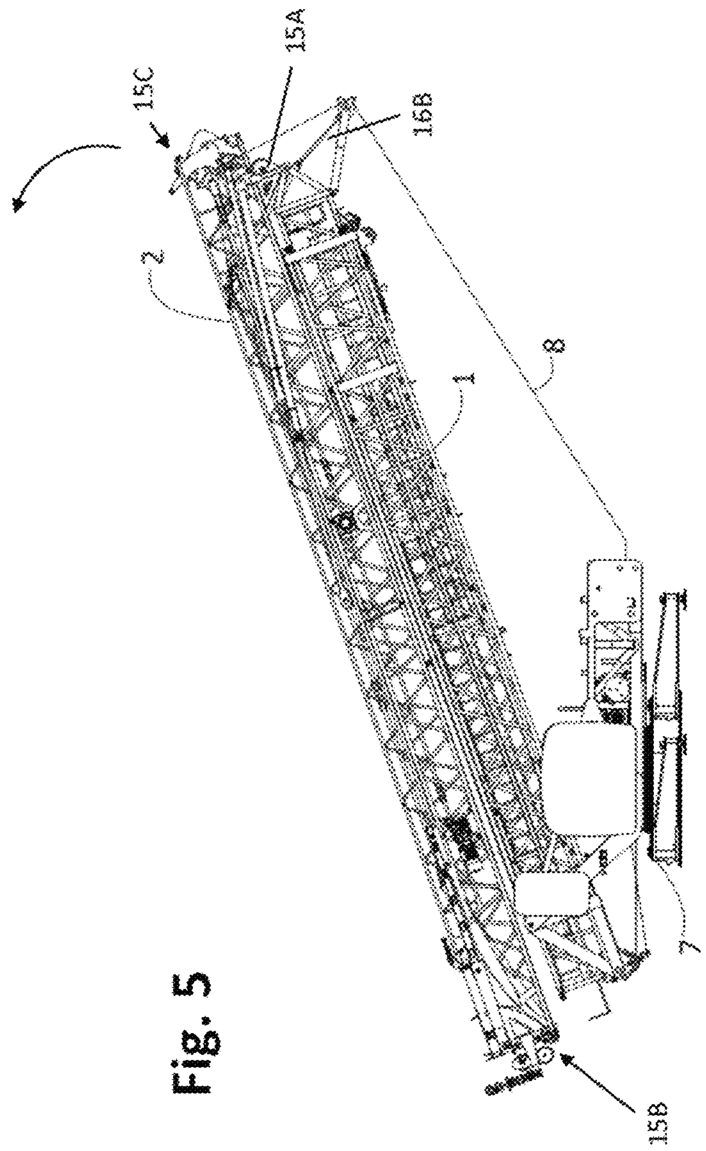
FIG. 5 is a side elevation view of the crane according to the invention in a phase of its erection from the transport position illustrated in FIG. 2 towards its working position.

FIG. 5 shows the tower crane in a phase of erection of the mast (1) towards its vertical position (in the direction of the arrow), in which the boom sections are still folded over the mast (1).

Figure 6:
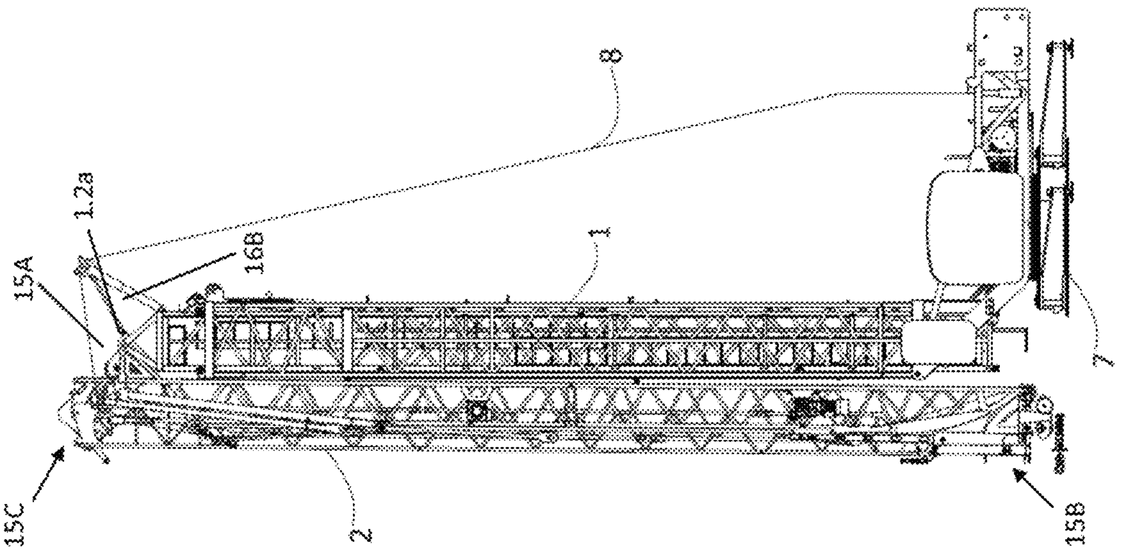
FIG. 6 is a side elevation view of the crane according to the invention in a phase of its erection from the position illustrated in FIG. 5 towards its working position.

FIG. 6 shows the tower crane in a following phase in which the mast (1) is in its vertical position, in which the boom sections are still folded over the mast (1) before the second boom section (2.2) has been bent over the first boom section (2.1) and the proximal and distal parts (18*a*, 18*b*) of the joint body (18) have been brought together and locked to form the joint body.

Figure 7:
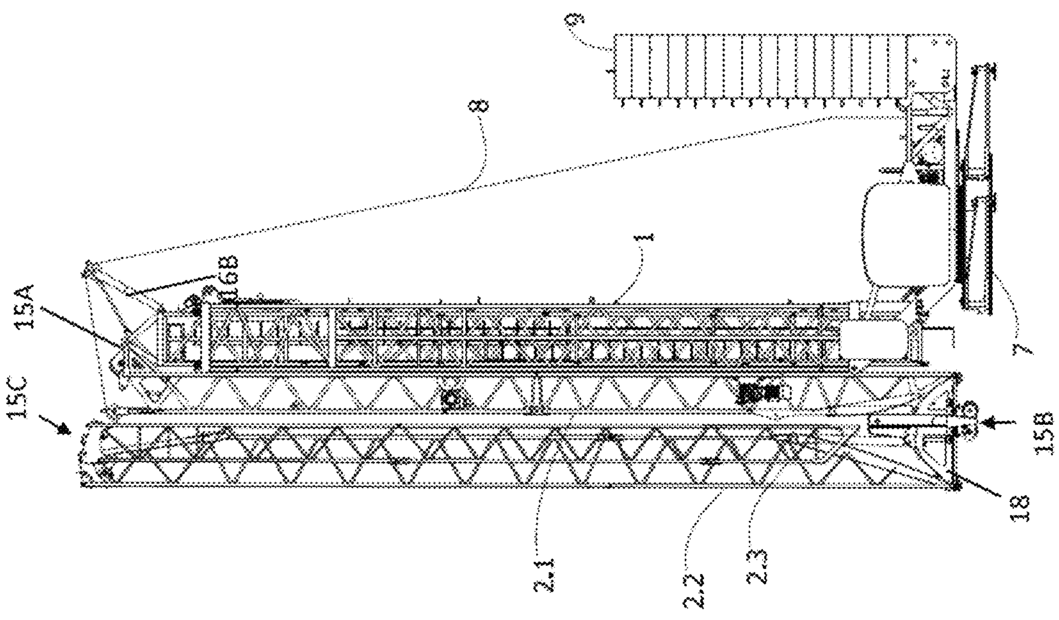
FIG. 7 is a side elevation view of the crane according to the invention in a following phase of its erection from the position illustrated in FIG. 6 towards its working position.
Figure 7A:
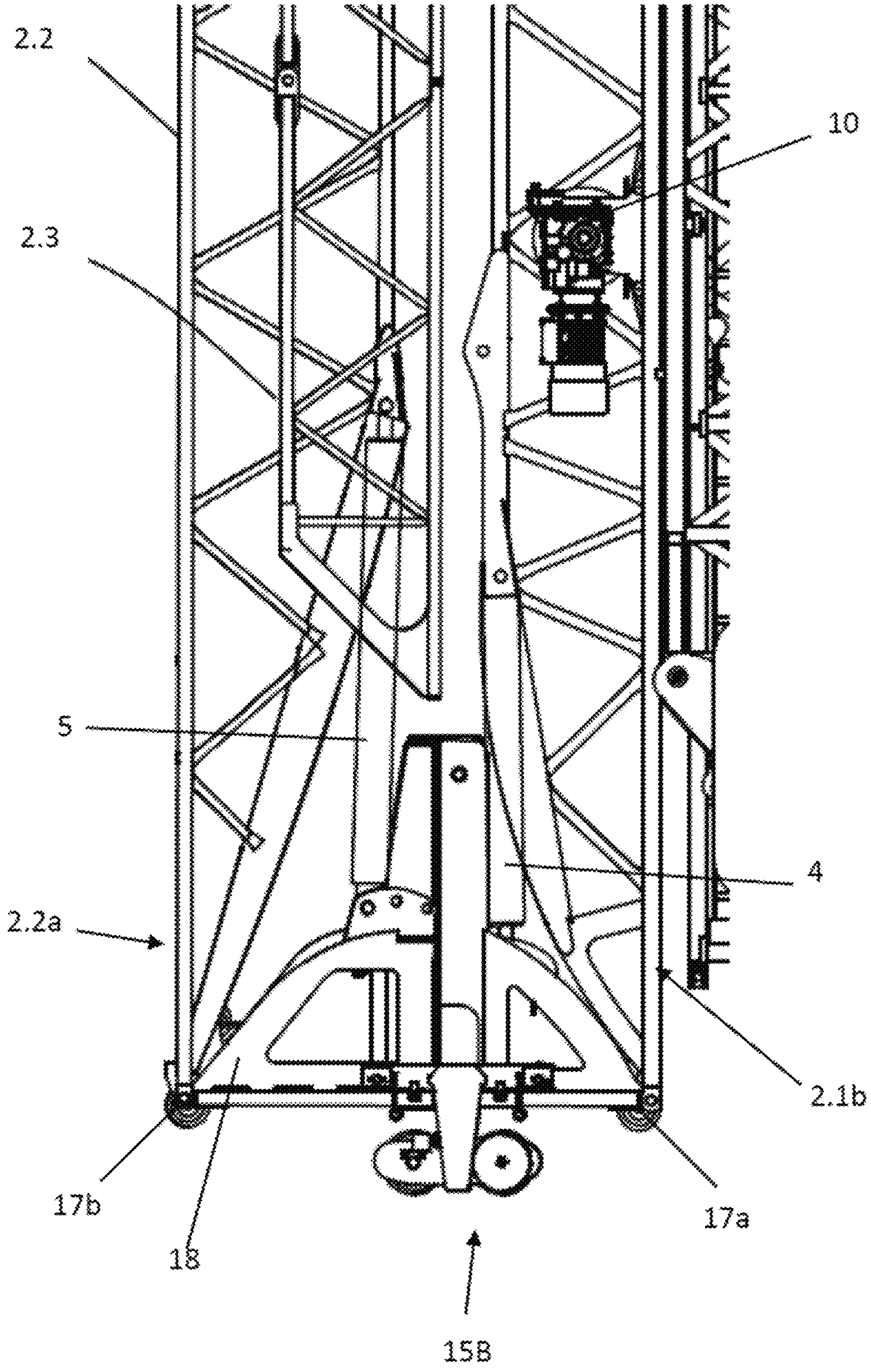
FIG. 7A is an enlarged side elevation view of the area near the joint 15B of the crane illustrated in FIG. 7.

FIG. 7 shows the tower crane in a following phase in which the mast (1) is in its vertical position, in which the boom sections remain folded over the mast (1) after the second boom section (2.2) has been bent over the first boom section (2.1) and the proximal and distal parts (18*a*, 18*b*) of the joint body (18) have been brought together and locked to form the joint body (18) (see FIG. 7A). As can be seen in FIG. 7A, in this phase the hydraulic actuators (4, 5) are in their retracted positions so that the boom sections (2.1, 2.2) remain folded over one another.

Figure 8:
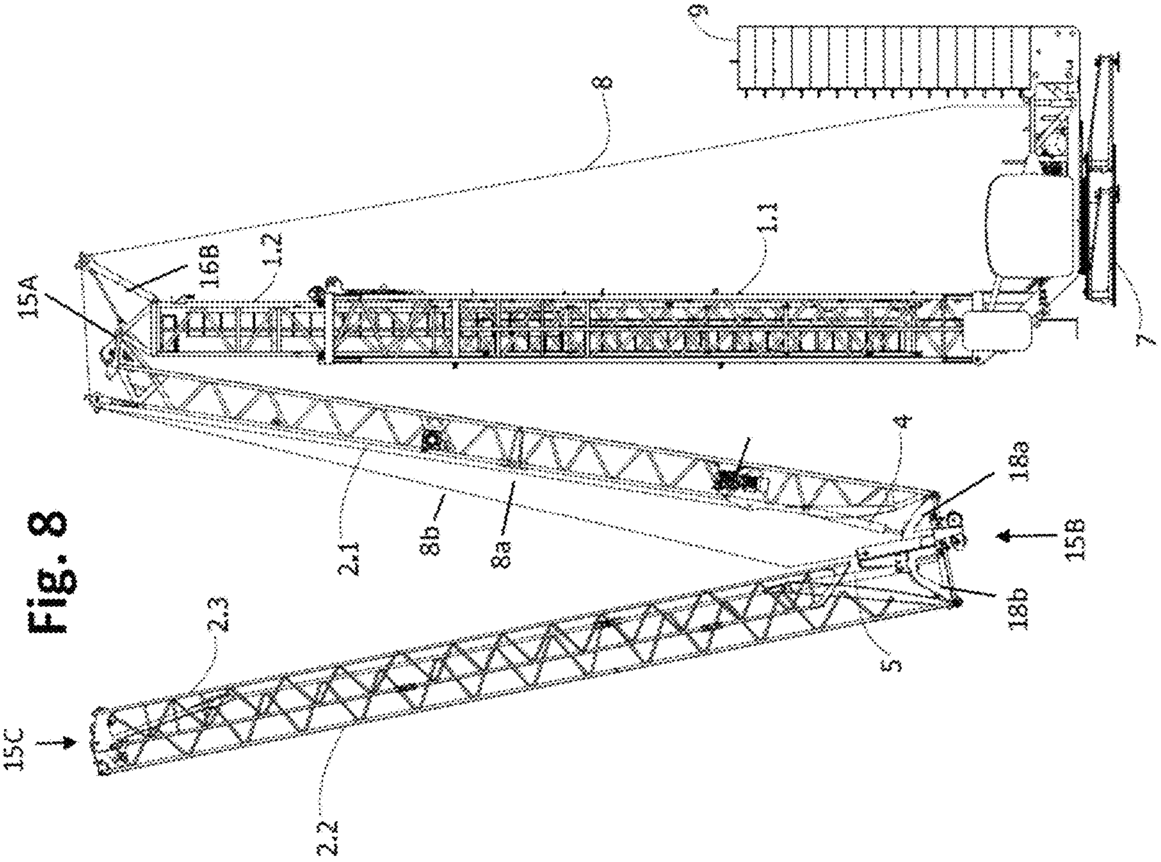
FIG. 8 is a side elevation view of the crane according to the invention in a following phase of its erection from the position illustrated in FIG. 7 towards its working position.
Figure 8A:
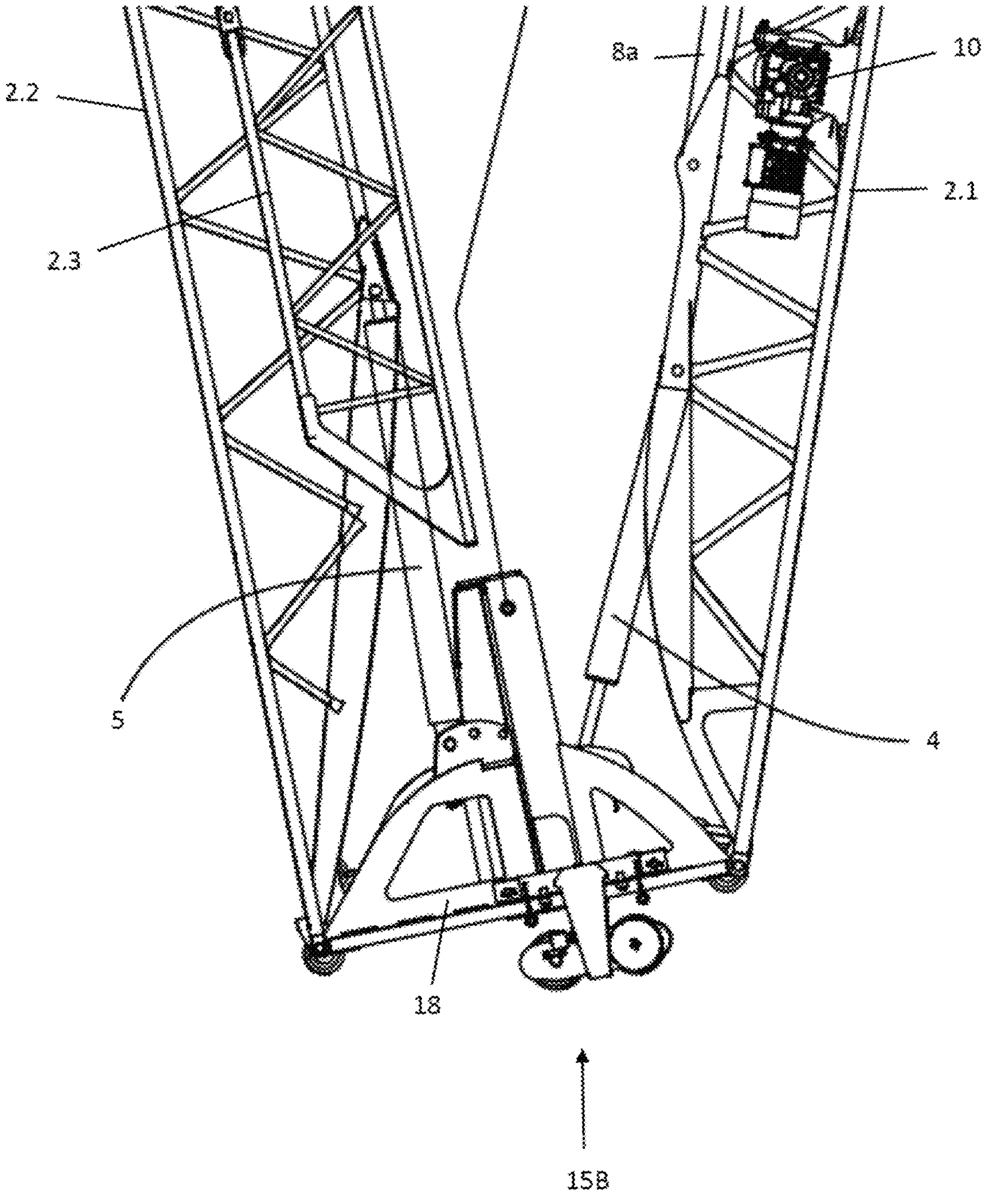
FIG. 8A is an enlarged side elevation view of the area near the joint 15B of the crane illustrated in FIG. 8.

FIG. 8 shows the tower crane in a following assembly phase in which the boom sections (2.1, 2.2) gradually unfold (see FIG. 8A). As can be seen in FIG. 8A, in this phase the first hydraulic actuator (4) has been extended and has forced the joint body (18) to rotate with respect to the first boom section (2.1), so that the second boom section (2.2) has started to unfold.

Figure 9:
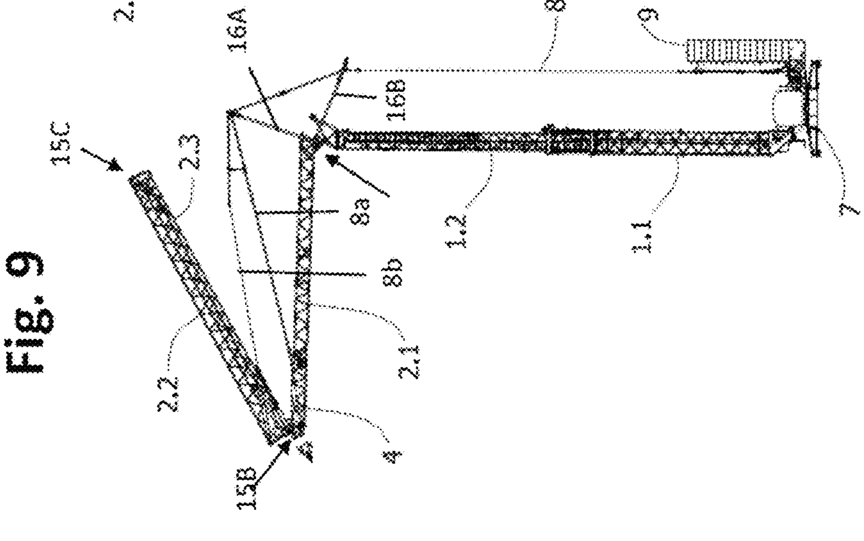
Figure 9A:
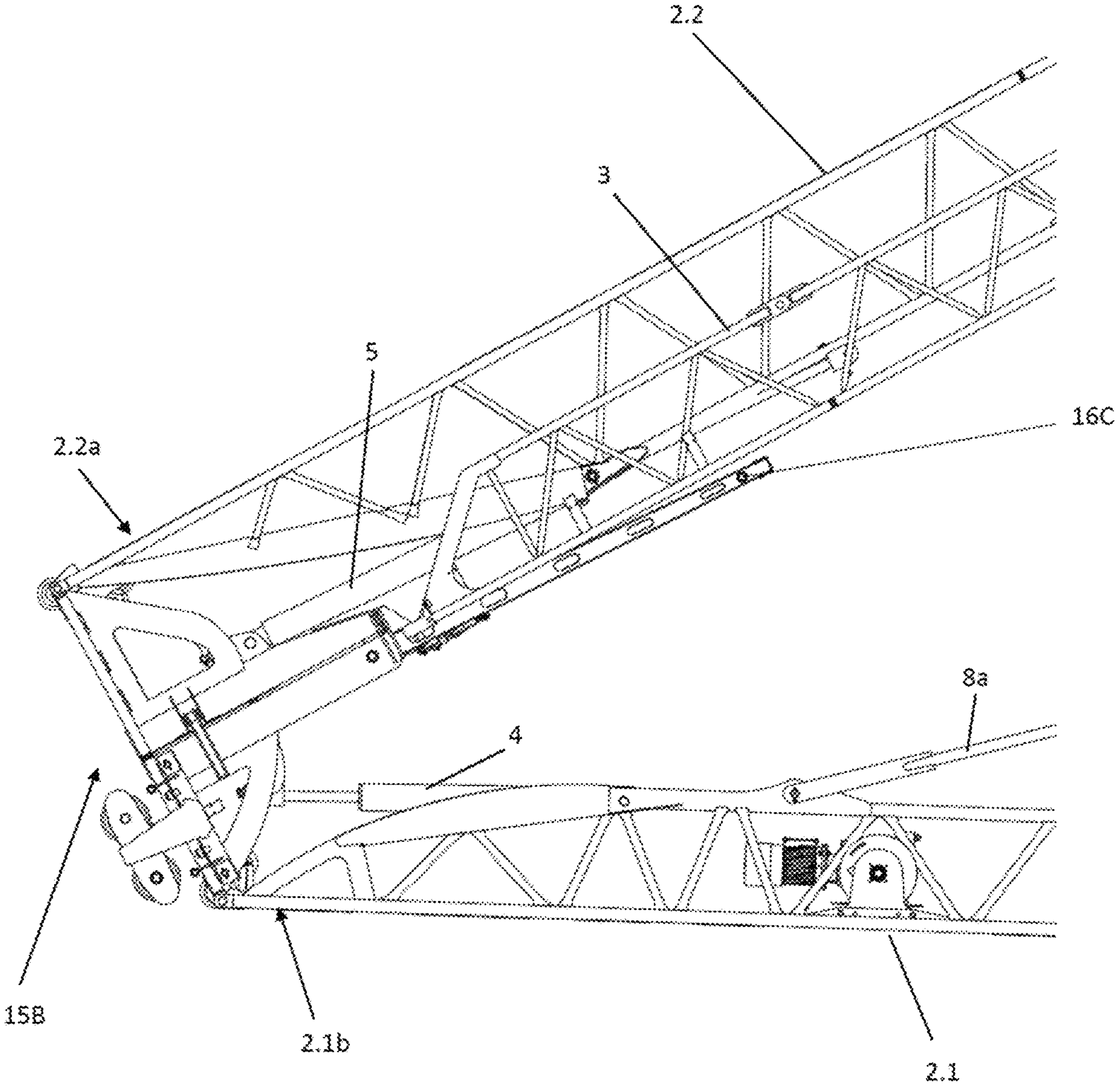
FIG. 9A is an enlarged side elevation view of the area near the joint 15B of the crane illustrated in FIG. 9.

FIG. 9 illustrates a following phase of the deployment of the boom sections (2.1, 2.2), in which the tower has been telescopically extended in its vertical position, the first boom section (2.1) is unfolded to its horizontal position, the second boom section (2.2) is in a partially unfolded position towards its working position, and the third boom section (2.3) is still folded over the second boom section (2.2). As can be seen in FIG. 9A, the first hydraulic actuator (4) remains in the extended position and the second hydraulic actuator (5) remains in the retracted position, shown in FIGS. 8 and 8A.

Figure 10:
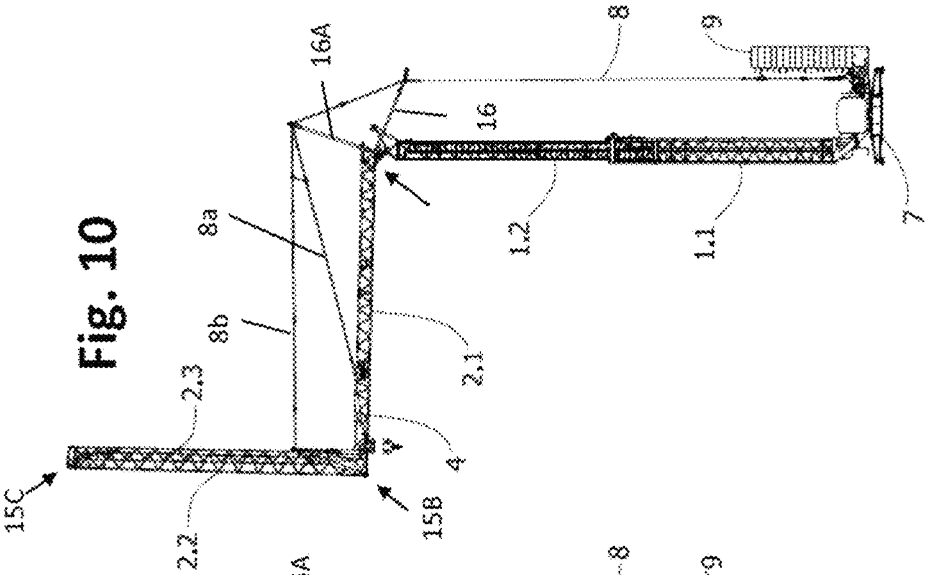
Figure 10A:
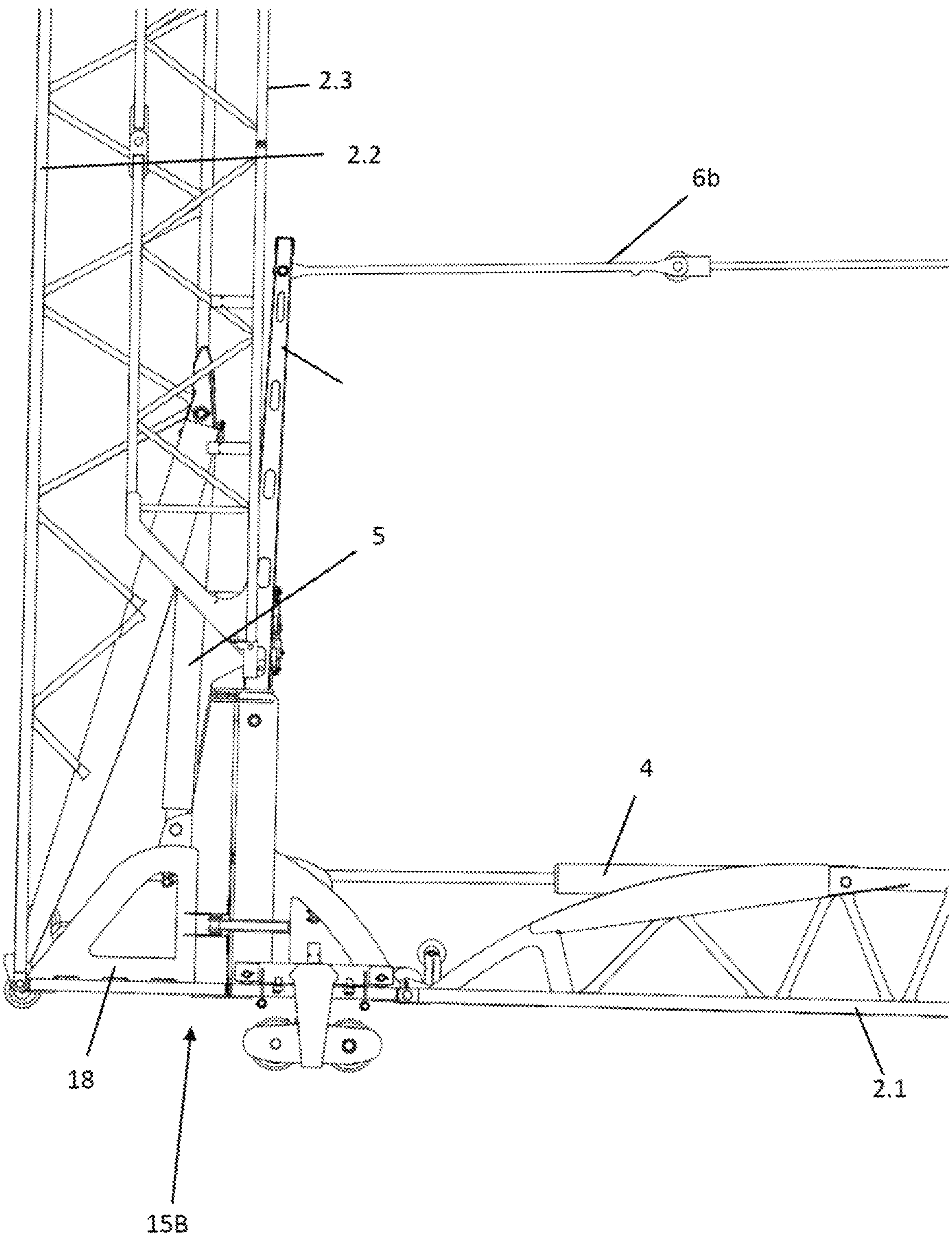
FIG. 10A is an enlarged side elevation view of the area near the joint 15B of the crane illustrated in FIG. 10.
Figure 11A:
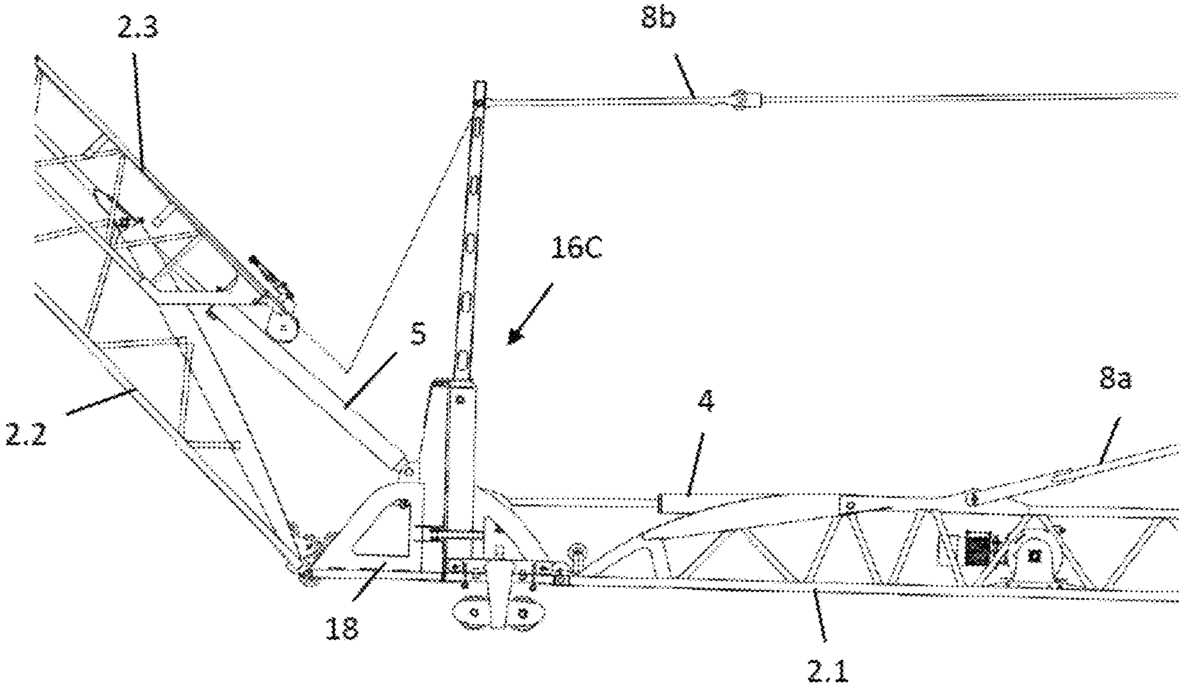
FIG. 11A is an enlarged side elevation view of the area near the joint 15B of the crane illustrated in FIG. 11.

FIG. 10 illustrates a following phase of the deployment of the boom sections (2.1, 2.2), in which the first boom section (2.1) is unfolded to its horizontal position, the second boom section (2.2) is in a more unfolded position towards its working position, and the third boom section (2.3) remains folded over the second boom section (2.2). As can be seen in FIG. 10A, the first actuator (4) has been fully extended forcing the joint body (18) into a first alignment position in which the lower part of the joint body (18) is aligned with the lower part of the first boom section (2.1). In addition, in this phase, the third support strut (16C) has rotated to its unfolded working position in which it is positioned orthogonally to the first boom section (2.1).

Figure 11:
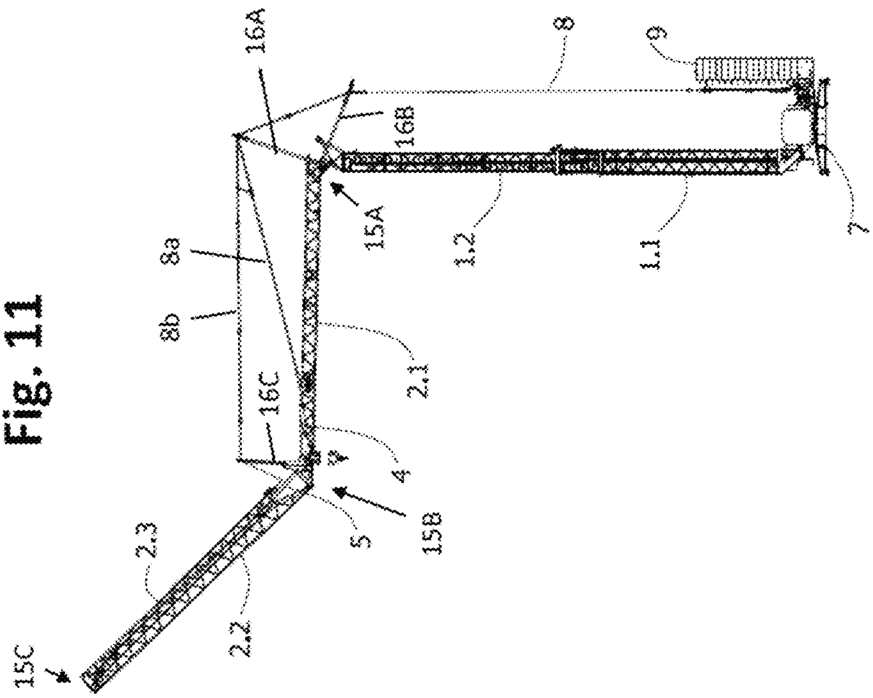
FIGS. 9-11 are side elevation views respectively showing successive phases of deployment of the boom from the position illustrated in FIG. 7 towards its working position.

FIG. 11 illustrates a following phase of the deployment of the boom sections (2.1, 2.2), in which the first boom section (2.1) is unfolded to its horizontal position, the second boom section (2.2) is in an even more unfolded position towards its working position, and the third boom section (2.3) remains folded over the second boom section (2.2). As can be seen in FIG. 11, in this phase the second hydraulic actuator (5) has been partially extended so that it is forcing the second boom section (2.2) to rotate with respect to the joint body (18).

Figure 12:
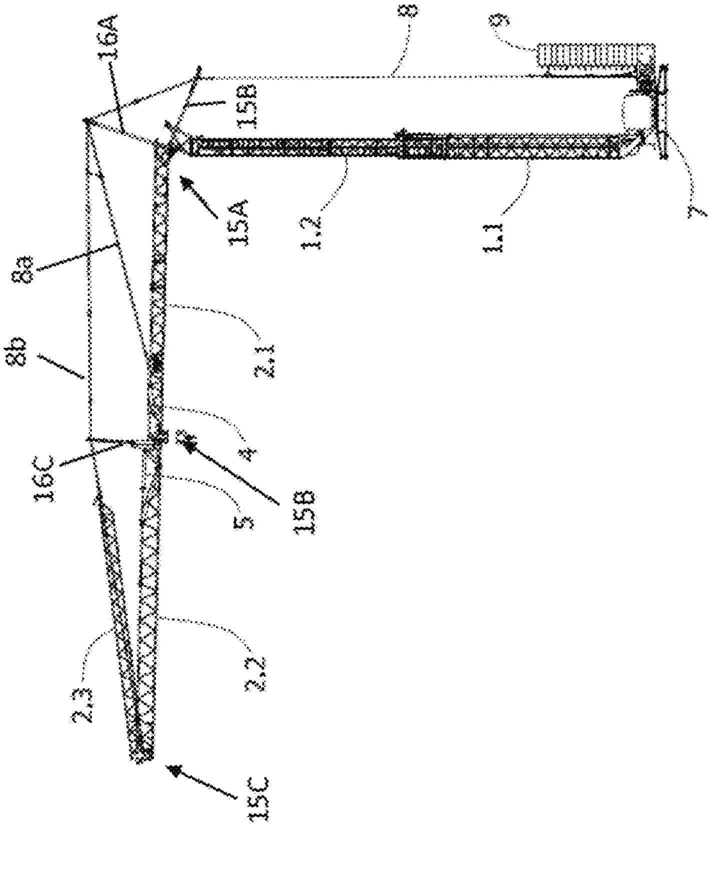
Figure 12A:
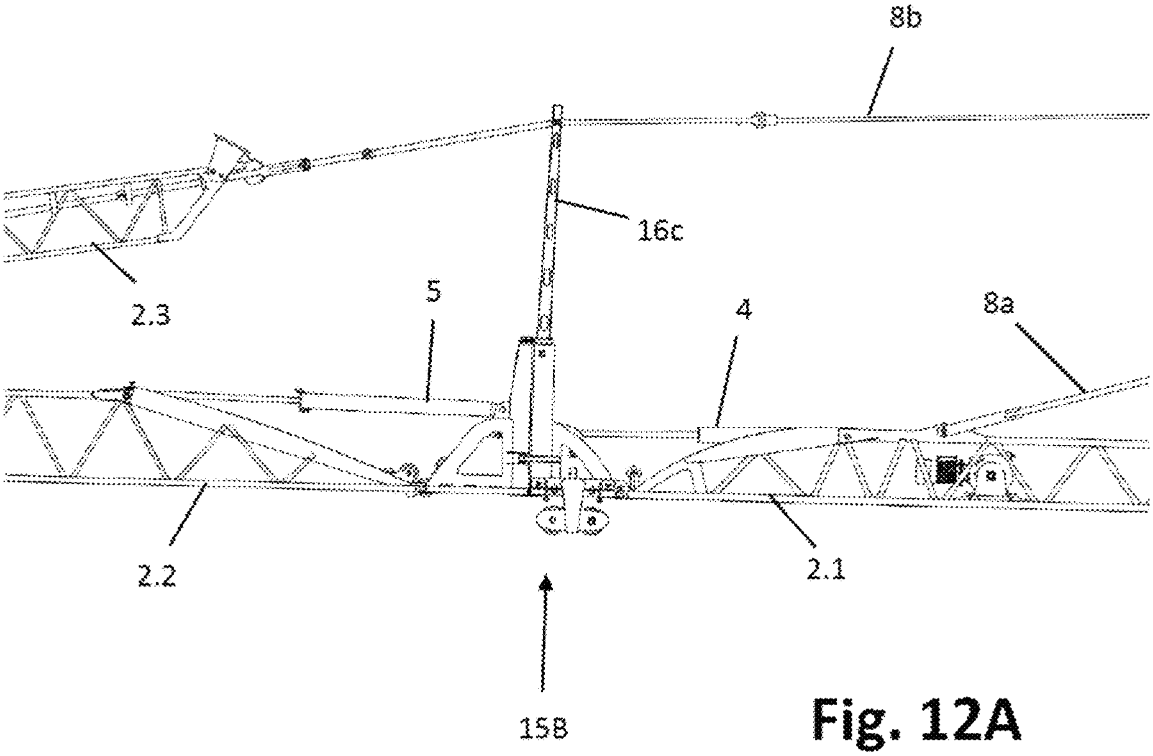
FIG. 12A is an enlarged side elevation view of the area near the joint 15B of the crane illustrated in FIG. 12.
Figure 12B:
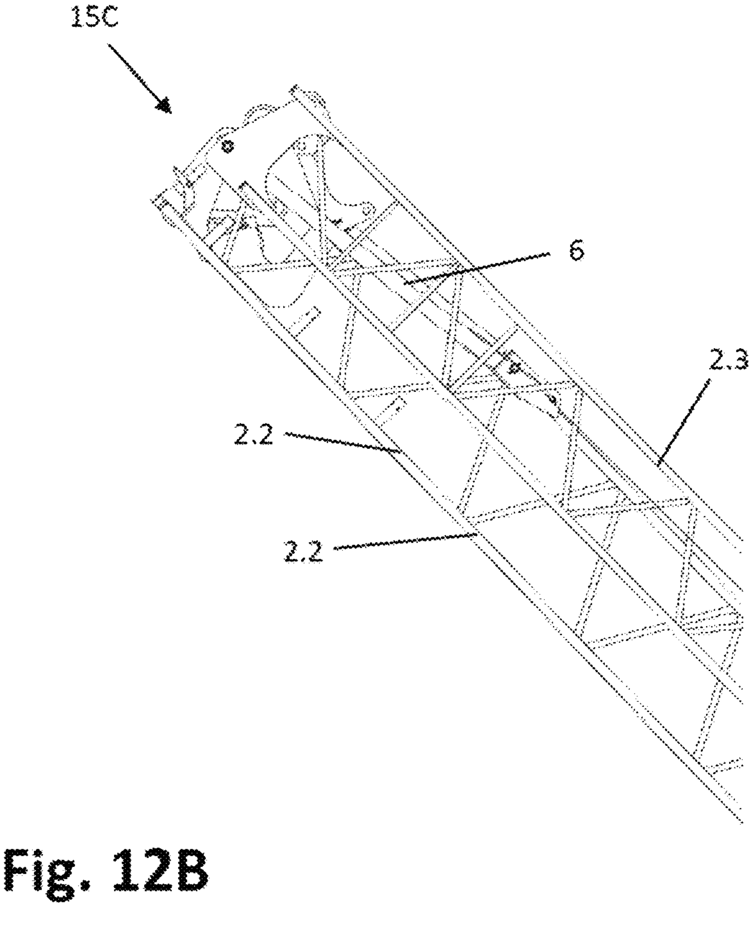
FIG. 12B is an enlarged side elevation view of the area near the joint 15C of the crane illustrated in FIG. 12.

FIG. 12 illustrates a following phase in the deployment of the third boom section (2.3) and in which the first and second boom sections (2.1, 2.2) are unfolded to their horizontal position, and the third boom section (2.3) has started its deployment of the second boom section (2.2). As can be seen in FIG. 12A, in this phase the hydraulic actuators (4, 5) are fully extended so that the joint body (18) is fully aligned with the boom sections (2.1, 2.2). On the other hand, FIG. 12B shows that in this phase the third boom section (2.3) remains folded on the second boom section (2.2).

Figure 13:
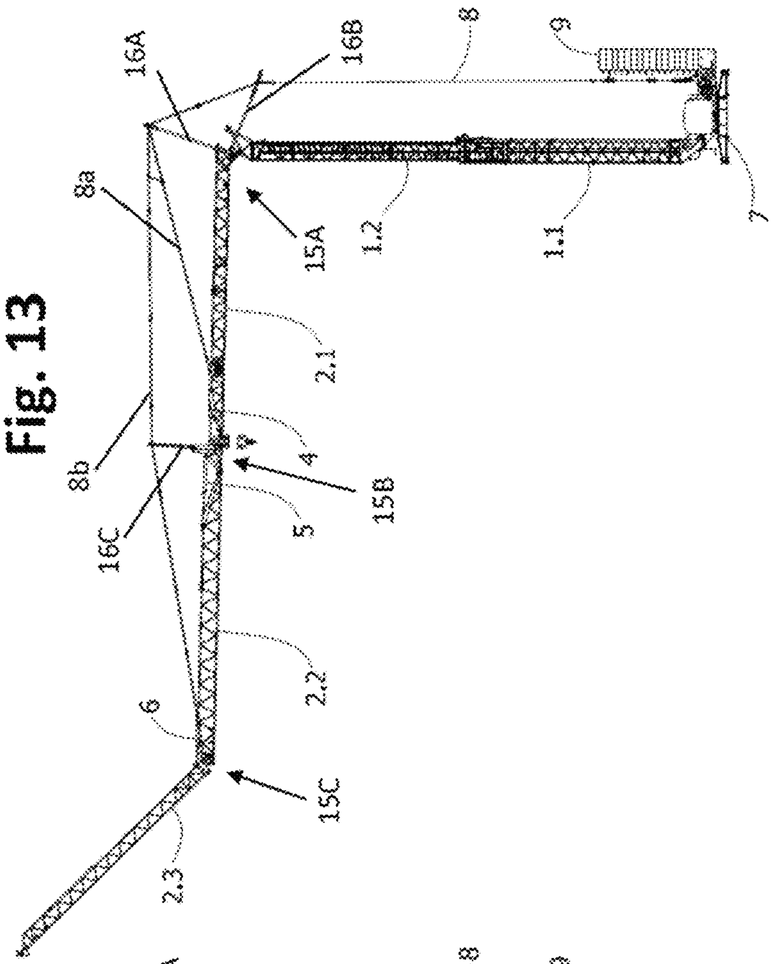
FIGS. 12-13 are side elevation views respectively showing successive phases of deployment of the boom from the position illustrated in FIG. 11 towards its working position.
Figure 13A:
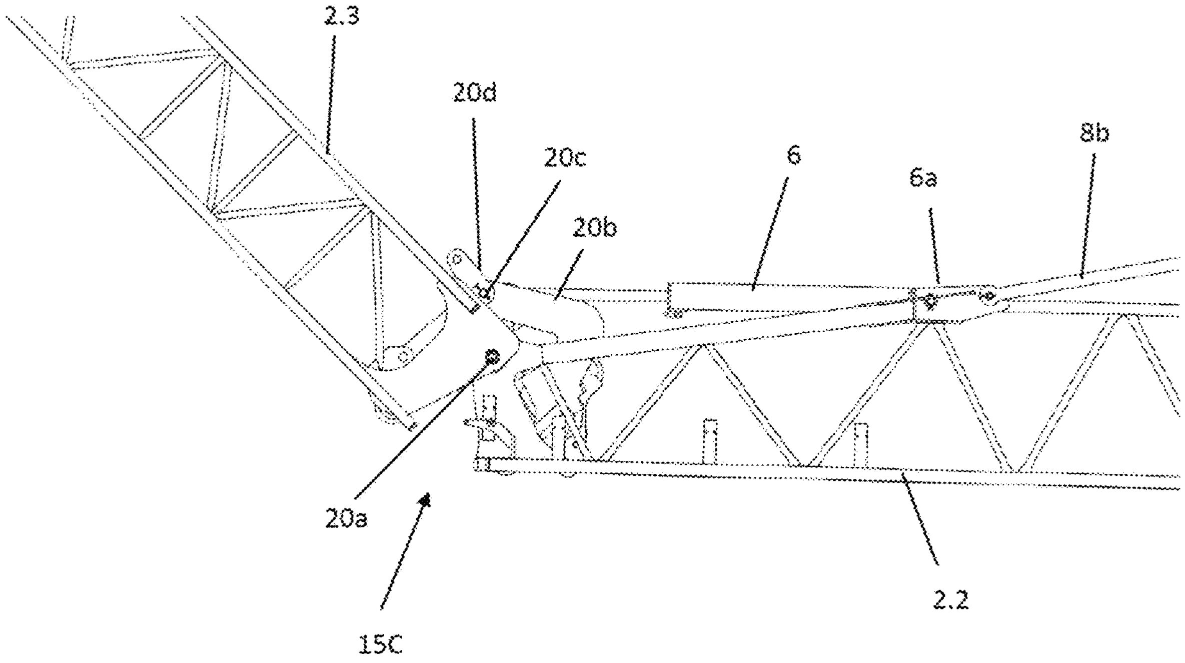
FIG. 13A is an enlarged side elevation view of the area near the joint 15C of the crane illustrated in FIG. 13.

FIG. 13 illustrates a following phase of the deployment of the section of the third boom section (2.3) in which the first and second boom sections (2.1, 2.2) are unfolded to their horizontal position, and the third boom section (2.3) continues with its deployment of the second boom section (2.2). As can be seen in FIG. 13A, in this phase the third hydraulic actuator has started to extend forcing the third boom section (2.3) to unfold from the second boom section (2.2). The further extension of the third hydraulic actuator (6) will lead the second and third boom sections (2.2, 2.3) to adopt the alignment position that can be seen in FIGS. 1D and 1E.

In the deployment phases of the boom (2) illustrated in FIGS. 8-13, the bracing sling (8) confers stability on the deployment.

FIG. 14 illustrates the tower crane according to the invention in its maintenance position. It can be seen that the auxiliary support (3) is arranged at the free distal end (2.3*b*) of the third boom portion (2.3) such that the auxiliary support (3) rests on the ground (S) when the boom (2) is in a maintenance position in which the boom (2) extends vertically inclined from the first rotary joint (15A) and, in turn, the mast (1) is in an intermediate extension position between its retracted vertical position and its extended vertical position. In this maintenance position, the operator can access the boom (2) and its elements to carry out maintenance and repair work on the boom (2) by simply climbing up the boom (2) without needing hoisting means to lift the operator to the boom (2).

Figure 14B:
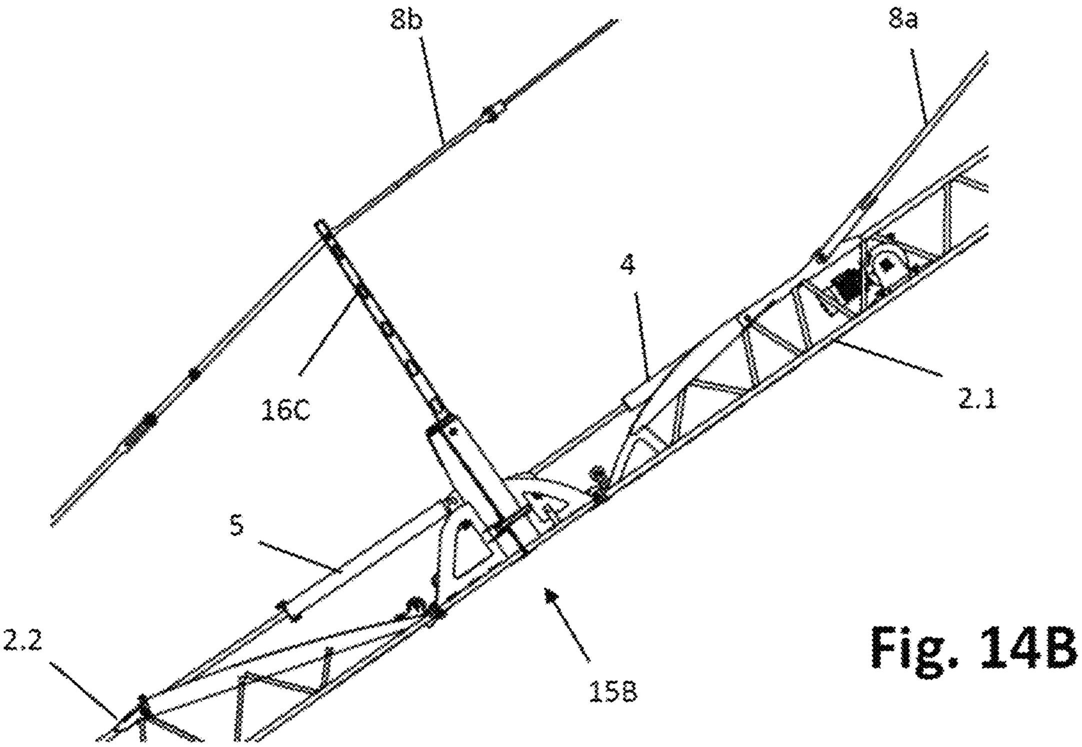
FIG. 14B is an enlarged side elevation view of the area near the joint 15B of the crane illustrated in FIG. 14.
Figure 14C:
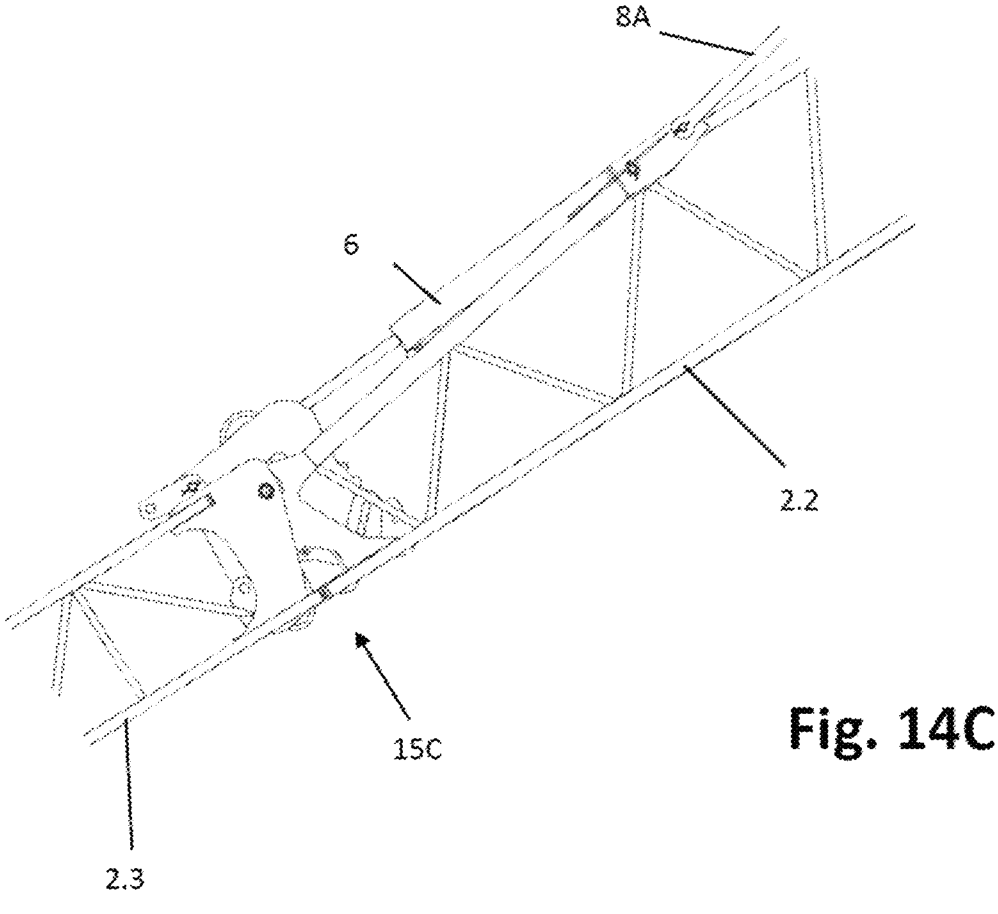
FIG. 14C is an enlarged side elevation view of the area near the joint 15C of the crane illustrated in FIG. 14.

As can be seen in FIG. 14A, the auxiliary support (3) comprises two vertical wings (3*b*) joined at their lower ends by a base (3*a*), and is fixed to the respective side parts of the free distal end (2.3*b*) of the third boom section (2.2). FIGS. 14B and 14C show that in the maintenance position the boom sections (2.1, 2.2, 2.3) are in the same positions as those shown in FIGS. 1, 1A, 1C, 1D and 1E.

The invention claimed is:

1. An automated collapsible tower crane movable between a transport position and a working position, comprising:

- a telescopically extending mast with at least an upper telescopic portion with an upper end part, and a lower telescopic portion with a lower part rotatably anchored in a vertical plane to a lower base platform of the tower crane;
- a mast locking mechanism to lock the lower telescopic portion in a locked position in a substantially vertical plane with respect to a lower base platform of the tower crane;
- a telescoping system of the mast to telescopically extend and retract the mast between a retracted vertical position in which the mast is in a non-extended vertical position and an extended vertical position in which the mast extends upwards, wherein the telescoping system comprising a combination of cable and pulleys driven by a winch;
- a boom comprising a plurality of boom sections articulated by proximal and distal in respective rotary joints along respective rotation angles limited to substantially 180° around respective horizontal axes to stiffen the boom when it the boom is extended, the plurality boom sections comprising a first boom section, a second boom section and a third boom section, wherein the first boom section is articulated with the upper end part of the upper telescopic portion of the mast and at one end of the proximal portion of a second boom section;
- a boom reinforcement system for strengthening the boom in a working position;
- wherein in the transport position the boom sections are folded down over one another and on the mast in folding planes;
- wherein the boom reinforcement system acts independently of the combination of cables and pulleys driven by the winch of the telescoping system, and comprises hydraulic actuators hydraulically powered by hydraulic equipment for folding and unfolding the boom sections;
- wherein each proximal and distal rotary joint is associated with at least one of the hydraulic actuators arranged to unfold and fold boom sections relative to one another; and
- wherein the first boom section and the second boom section are articulated by a proximal rotary joint, the proximal rotary joint is formed by a joint body comprises a proximal part and a distal part which are joined by means of a hinge mechanism and means of a connector mechanism;
- and wherein the third boom section is articulated at the second boom section by a distal rotary hinge joint comprising:

a primary horizontal joint axis that articulates the proximal portion of the distal section with the distal portion of the second boom section;

a fixed lever arm immobilised on the proximal portion of the third boom section and presenting a free end with a secondary joint axis;

a rotary angle arm with a first leg articulated with the primary horizontal joint axis and a second leg articulated with the secondary joint axis; and an intermediate part between the first and second legs of the rotary angle arm in which the distal end of the hydraulic actuator is articulated and wherein the proximal end of the hydraulic actuator is articulated in the distal portion of the second boom section.

2. The automated collapsible tower crane, according to claim 1, wherein the proximal part of the proximal rotary joint comprises the joint body further comprising:

a first lower end part in which a first lower horizontal axis is arranged and on which one end of the distal portion of the first boom section is rotatably coupled;

a first upper part with a first upper horizontal axis which is articulated with a distal end of a first hydraulic actuator, the first hydraulic actuator further comprising a proximal end articulated with an upper point in the distal portion of the first boom section;

and wherein the distal part of the proximal rotary joint comprising:

a second lower end part in which a second lower horizontal axis is arranged and on which one end of the proximal portion of the second boom section is rotatably coupled; and a second upper part with a second upper horizontal axis articulated at a proximal end of a second hydraulic actuator, the second hydraulic actuator further comprising a distal end articulated at an upper point in the proximal portion of the second boom section; and wherein the lower horizontal axes of the proximal and distal parts are further apart from each other than the upper horizontal axes;

and wherein the upper horizontal axes of the proximal and distal parts are not aligned.

3. The automated collapsible tower crane according to claim 1, wherein the third boom section is a distal boom section, and the distal boom section constitutes a distal boom portion with a free distal end.

4. The automated collapsible tower crane according to claim 3, wherein the distal boom section further comprising an auxiliary support arranged at the free distal end of the distal boom portion in such a way that the auxiliary support rests on the ground when the boom is in a maintenance position in which the boom extends vertically inclined from the first rotary joint.

5. The automated collapsible tower crane according to claim 4, wherein the auxiliary support rests on the ground when the boom is unfolded and the mast is between a retracted vertical position and a extended vertical position.

6. The automated collapsible tower crane according to claim 1, wherein:

a sling is divided into a first branch and a second branch from a connection to a first support strut;

wherein the first branch is connected to a distal portion of the first boom section of the boom while the second branch is connected to a distal portion of the second boom section of the boom.

7. The automated collapsible tower crane, according to claim 1, wherein the boom reinforcement system comprising a bracing sling anchored to:

the lower base platform;

a first superiorly articulated vertically rotatable support strut of a proximal portion of the first boom section;

a second vertically rotatable support strut articulated posteriorly of the proximal portion of the first boom section; and at least a third superiorly articulated vertically rotatable support strut of a distal portion of the first boom section of the boom;

wherein the sling is connected to the support struts.

* * * * *